(12) United States Patent
Koehl

(10) Patent No.: US 9,371,829 B2
(45) Date of Patent: Jun. 21, 2016

(54) PUMP CONTROLLER SYSTEM AND METHOD

(75) Inventor: Robert M. Koehl, Lakemoor, IL (US)

(73) Assignee: Pentair Water Pool and Spa, Inc., Cary, NC (US)

( * ) Notice: Subject to any disclaimer, the term of this patent is extended or adjusted under 35 U.S.C. 154(b) by 249 days.

(21) Appl. No.: 11/980,096

(22) Filed: Oct. 30, 2007

(65) Prior Publication Data

US 2008/0260540 A1 Oct. 23, 2008

Related U.S. Application Data

(62) Division of application No. 10/730,747, filed on Dec. 8, 2003.

(51) Int. Cl.
| | |
|---|---|
| *F04B 49/06* | (2006.01) |
| *F04B 49/10* | (2006.01) |
| *F04D 15/02* | (2006.01) |
| *F04D 15/00* | (2006.01) |
| *G05B 15/02* | (2006.01) |

(52) U.S. Cl.
CPC ............... *F04B 49/10* (2013.01); *F04B 49/06* (2013.01); *F04B 49/065* (2013.01); *F04D 15/0066* (2013.01); *F04D 15/0088* (2013.01); *F04D 15/02* (2013.01); *F04D 15/0236* (2013.01); *G05B 15/02* (2013.01)

(58) Field of Classification Search
CPC .............. F04D 27/004; F04D 15/0066; F04D 15/0088; G05B 15/02; F04B 49/065; F04B 2205/05
USPC .................... 417/1, 36, 38, 44.2, 53
See application file for complete search history.

(56) References Cited

U.S. PATENT DOCUMENTS

| | | | |
|---|---|---|---|
| 1,061,919 A | 5/1913 | Miller |
| 1,993,267 A | 3/1935 | Ferguson |
| 2,238,597 A | 4/1941 | Page |
| 2,458,006 A | 1/1949 | Kilgore |
| 2,488,365 A | 11/1949 | Abbott |
| 2,494,200 A | 1/1950 | Ramqvist |
| 2,615,937 A | 10/1952 | Ludwig |
| 2,716,195 A | 8/1955 | Anderson |
| 2,767,277 A | 10/1956 | Wirth |

(Continued)

FOREIGN PATENT DOCUMENTS

| | | |
|---|---|---|
| AU | 3940997 A1 | 2/1998 |
| AU | 2005204246 A1 | 3/2006 |

(Continued)

OTHER PUBLICATIONS

"Better, Stronger, Faster;" Pool & Spa News, Sep. 3, 2004; pp. 52-54, 82-84, USA.

(Continued)

*Primary Examiner* — Bryan Lettman
*Assistant Examiner* — Philip Stimpert
(74) *Attorney, Agent, or Firm* — Quarles & Brady LLP

(57) ABSTRACT

A method and apparatus for a pump control system. One or more embodiments of the invention include a pump controller that can perform a self-calibrating procedure, can provide precise motor speed control, can provide a limp mode before shutting down the motor when system parameters are exceeded and/or fault conditions occur, can detect fault conditions, and can store fault conditions for later retrieval.

9 Claims, 12 Drawing Sheets

(56) References Cited

U.S. PATENT DOCUMENTS

| | | |
|---|---|---|
| 2,778,958 A | 1/1957 | Hamm |
| 2,881,337 A | 4/1959 | Wall |
| 3,116,445 A | 12/1963 | Wright |
| 3,191,935 A | 6/1965 | Uecker |
| 3,204,423 A | 9/1965 | Resh, Jr. |
| 3,213,304 A | 10/1965 | Landberg |
| 3,226,620 A | 12/1965 | Elliott et al. |
| 3,227,808 A | 1/1966 | Morris |
| 3,291,058 A | 12/1966 | McFarlin |
| 3,481,973 A | 12/1969 | Wygant |
| 3,530,348 A | 9/1970 | Connor |
| 3,558,910 A | 1/1971 | Dale |
| 3,559,731 A | 2/1971 | Stafford |
| 3,562,614 A | 2/1971 | Gramkow |
| 3,566,225 A | 2/1971 | Paulson |
| 3,573,579 A | 4/1971 | Lewus |
| 3,581,895 A | 6/1971 | Howard |
| 3,593,081 A | 7/1971 | Forst |
| 3,594,623 A | 7/1971 | LaMaster |
| 3,596,158 A | 7/1971 | Watrous |
| 3,613,805 A | 10/1971 | Lindstad |
| 3,624,470 A | 11/1971 | Johnson |
| 3,652,912 A | 3/1972 | Bordonaro |
| 3,671,830 A | 6/1972 | Kruger |
| 3,737,749 A | 6/1973 | Schmit |
| 3,761,792 A | 9/1973 | Whitney |
| 3,777,232 A | 12/1973 | Woods et al. |
| 3,778,804 A | 12/1973 | Adair |
| 3,780,759 A | 12/1973 | Yahle et al. |
| 3,781,925 A | 1/1974 | Curtis |
| 3,787,882 A | 1/1974 | Fillmore |
| 3,792,324 A | 2/1974 | Suarez |
| 3,800,205 A | 3/1974 | Zalar |
| 3,838,597 A | 10/1974 | Montgomery |
| 3,882,364 A | 5/1975 | Wright |
| 3,902,369 A | 9/1975 | Metz |
| 3,913,342 A | 10/1975 | Barry |
| 3,916,274 A | 10/1975 | Lewus |
| 3,949,782 A | 4/1976 | Athey |
| 3,953,777 A | 4/1976 | McKee |
| 3,956,760 A | 5/1976 | Edwards |
| 3,963,375 A | 6/1976 | Curtis |
| 3,976,919 A | 8/1976 | Vandevier |
| 4,000,446 A | 12/1976 | Vandevier |
| 4,021,700 A | 5/1977 | Ellis Anwyl |
| 4,041,470 A | 8/1977 | Slane |
| 4,061,442 A | 12/1977 | Clark et al. |
| 4,123,792 A | 10/1978 | Gephart |
| 4,133,058 A | 1/1979 | Baker |
| 4,142,415 A | 3/1979 | Jung et al. |
| 4,151,080 A | 4/1979 | Zuckerman |
| 4,168,413 A | 9/1979 | Halpine |
| 4,182,363 A | 1/1980 | Fuller et al. |
| 4,185,187 A | 1/1980 | Rogers |
| 4,206,634 A | 6/1980 | Taylor |
| 4,225,290 A | 9/1980 | Allington |
| 4,241,299 A | 12/1980 | Bertone |
| 4,263,535 A | 4/1981 | Jones |
| 4,276,454 A | 6/1981 | Zathan |
| 4,286,303 A | 8/1981 | Genheimer |
| 4,303,203 A | 12/1981 | Avery |
| 4,307,327 A | 12/1981 | Streater et al. |
| 4,314,478 A | 2/1982 | Beaman |
| 4,319,712 A | 3/1982 | Bar |
| 4,322,297 A | 3/1982 | Bajka |
| 4,330,412 A | 5/1982 | Frederick |
| 4,353,220 A | 10/1982 | Curwen |
| 4,366,426 A | 12/1982 | Turlej |
| 4,370,098 A | 1/1983 | McClain |
| 4,370,690 A | 1/1983 | Baker |
| 4,371,315 A | 2/1983 | Shikasho |
| 4,375,613 A | 3/1983 | Fuller et al. |
| 4,384,825 A | 5/1983 | Thomas |
| 4,399,394 A | 8/1983 | Ballman |
| 4,402,094 A | 9/1983 | Sanders |
| 4,409,532 A | 10/1983 | Hollenbeck |
| 4,419,625 A | 12/1983 | Bejot |
| 4,420,787 A | 12/1983 | Tibbits |
| 4,421,643 A | 12/1983 | Frederick |
| 4,427,545 A | 1/1984 | Arguilez |
| 4,428,434 A | 1/1984 | Gelaude |
| 4,429,343 A | 1/1984 | Freud |
| 4,437,133 A | 3/1984 | Rueckert |
| 4,448,072 A | 5/1984 | Tward |
| 4,449,260 A | 5/1984 | Whitaker |
| 4,453,118 A | 6/1984 | Phillips |
| 4,462,758 A | 7/1984 | Speed |
| 4,463,304 A | 7/1984 | Miller |
| 4,468,604 A | 8/1984 | Zaderej |
| 4,470,092 A | 9/1984 | Lombardi |
| 4,473,338 A | 9/1984 | Garmong |
| 4,494,180 A | 1/1985 | Streater |
| 4,496,895 A | 1/1985 | Kawate et al. |
| 4,504,773 A | 3/1985 | Suzuki |
| 4,505,643 A | 3/1985 | Millis |
| D278,529 S | 4/1985 | Hoogner |
| 4,514,989 A | 5/1985 | Mount |
| 4,520,303 A | 5/1985 | Ward |
| 4,541,029 A | 9/1985 | Ohyama |
| 4,545,906 A | 10/1985 | Frederick |
| 4,564,882 A | 1/1986 | Baxter |
| 4,581,900 A | 4/1986 | Lowe |
| 4,604,563 A | 8/1986 | Min |
| 4,605,888 A | 8/1986 | Kim |
| 4,610,605 A | 9/1986 | Hartley |
| 4,620,835 A | 11/1986 | Bell |
| 4,622,506 A | 11/1986 | Shemanske |
| 4,635,441 A | 1/1987 | Ebbing |
| 4,647,825 A | 3/1987 | Profio |
| 4,651,077 A | 3/1987 | Woyski |
| 4,658,195 A | 4/1987 | Min |
| 4,658,203 A | 4/1987 | Freymuth |
| 4,670,697 A | 6/1987 | Wrege |
| 4,676,914 A | 6/1987 | Mills |
| 4,678,404 A | 7/1987 | Lorett |
| 4,678,409 A | 7/1987 | Kurokawa |
| 4,686,439 A | 8/1987 | Cunningham |
| 4,695,779 A | 9/1987 | Yates |
| 4,697,464 A | 10/1987 | Martin |
| 4,703,387 A | 10/1987 | Miller |
| 4,705,629 A | 11/1987 | Weir |
| 4,716,605 A | 1/1988 | Shepherd |
| 4,719,399 A | 1/1988 | Wrege |
| 4,728,882 A | 3/1988 | Stanbro |
| 4,751,449 A | 6/1988 | Chmiel |
| 4,751,450 A | 6/1988 | Lorenz |
| 4,758,697 A | 7/1988 | Jeuneu |
| 4,761,601 A | 8/1988 | Zaderej |
| 4,764,417 A | 8/1988 | Gulya |
| 4,764,714 A | 8/1988 | Alley |
| 4,767,280 A | 8/1988 | Markuson |
| 4,780,050 A | 10/1988 | Caine |
| 4,781,525 A | 11/1988 | Hubbard |
| 4,782,278 A | 11/1988 | Bossi |
| 4,786,850 A | 11/1988 | Chmiel |
| 4,795,314 A | 1/1989 | Prybella |
| 4,801,858 A | 1/1989 | Min |
| 4,804,901 A | 2/1989 | Pertessis |
| 4,820,964 A | 4/1989 | Kadah |
| 4,827,197 A | 5/1989 | Giebeler |
| 4,834,624 A | 5/1989 | Jensen |
| 4,837,656 A | 6/1989 | Barnes |
| 4,839,571 A | 6/1989 | Farnham |
| 4,841,404 A | 6/1989 | Marshall |
| 4,843,295 A | 6/1989 | Thompson |
| 4,862,053 A | 8/1989 | Jordan |
| 4,864,287 A | 9/1989 | Kierstead |
| 4,885,655 A | 12/1989 | Springer |
| 4,891,569 A | 1/1990 | Light |
| 4,896,101 A | 1/1990 | Cobb |
| 4,907,610 A | 3/1990 | Meincke |
| 4,912,936 A | 4/1990 | Denpou |
| 4,913,625 A | 4/1990 | Gerlowski |
| 4,949,748 A | 8/1990 | Chatrathi |

(56) References Cited

U.S. PATENT DOCUMENTS

| | | |
|---|---|---|
| 4,958,118 A | 9/1990 | Pottebaum |
| 4,963,778 A | 10/1990 | Jensen |
| 4,967,131 A | 10/1990 | Kim |
| 4,971,522 A | 11/1990 | Butlin |
| 4,975,798 A | 12/1990 | Edwards et al. |
| 4,977,394 A | 12/1990 | Manson |
| 4,985,181 A | 1/1991 | Strada et al. |
| 4,986,919 A | 1/1991 | Allington |
| 4,996,646 A | 2/1991 | Farrington |
| D315,315 S | 3/1991 | Stairs, Jr. |
| 4,998,097 A | 3/1991 | Noth |
| 5,017,853 A | 5/1991 | Chmiel |
| 5,026,256 A | 6/1991 | Kuwabara |
| 5,041,771 A | 8/1991 | Min |
| 5,051,681 A | 9/1991 | Schwarz |
| 5,076,761 A | 12/1991 | Krohn |
| 5,076,763 A | 12/1991 | Anastos |
| 5,079,784 A | 1/1992 | Rist |
| 5,091,817 A | 2/1992 | Alley |
| 5,098,023 A | 3/1992 | Burke |
| 5,099,181 A | 3/1992 | Canon |
| 5,100,298 A | 3/1992 | Shibata |
| RE33,874 E | 4/1992 | Miller |
| 5,103,154 A | 4/1992 | Dropps |
| 5,117,233 A | 5/1992 | Hamos |
| 5,123,080 A | 6/1992 | Gillett |
| 5,145,323 A | 9/1992 | Farr |
| 5,151,017 A | 9/1992 | Sears |
| 5,154,821 A | 10/1992 | Reid |
| 5,156,535 A | 10/1992 | Budris |
| 5,158,436 A | 10/1992 | Jensen |
| 5,159,713 A | 10/1992 | Gaskill |
| 5,164,651 A | 11/1992 | Hu |
| 5,167,041 A | 12/1992 | Burkitt, III |
| 5,172,089 A | 12/1992 | Wright |
| D334,542 S | 4/1993 | Lowe |
| 5,206,573 A | 4/1993 | McCleer et al. |
| 5,234,286 A | 8/1993 | Wagner |
| 5,235,235 A | 8/1993 | Martin |
| 5,238,369 A | 8/1993 | Far |
| 5,240,380 A | 8/1993 | Mabe |
| 5,245,272 A | 9/1993 | Herbert |
| 5,247,236 A | 9/1993 | Schroeder |
| 5,255,148 A | 10/1993 | Yeh |
| 5,272,933 A | 12/1993 | Collier |
| 5,295,790 A | 3/1994 | Bossart |
| 5,296,795 A | 3/1994 | Dropps |
| 5,302,885 A | 4/1994 | Schwarz |
| 5,324,170 A | 6/1994 | Anastos |
| 5,327,036 A | 7/1994 | Carey |
| 5,342,176 A | 8/1994 | Redlich |
| 5,347,664 A | 9/1994 | Hamza et al. |
| 5,351,709 A | 10/1994 | Vos |
| 5,351,714 A | 10/1994 | Barnowski |
| 5,361,215 A | 11/1994 | Tompkins |
| 5,394,748 A | 3/1995 | McCarthy |
| 5,418,984 A | 5/1995 | Livingston, Jr. |
| D359,458 S | 6/1995 | Pierret |
| 5,422,014 A | 6/1995 | Allen et al. |
| 5,423,214 A | 6/1995 | Lee |
| 5,444,354 A | 8/1995 | Takahashi |
| D363,060 S | 10/1995 | Hunger |
| 5,471,125 A | 11/1995 | Wu |
| 5,473,497 A | 12/1995 | Beatty |
| 5,495,161 A | 2/1996 | Hunter |
| 5,499,902 A | 3/1996 | Rockwood |
| 5,511,397 A | 4/1996 | Makino |
| 5,512,809 A | 4/1996 | Banks et al. |
| 5,512,883 A | 4/1996 | Lane, Jr. |
| 5,518,371 A | 5/1996 | Wellstein |
| 5,519,848 A | 5/1996 | Wloka |
| 5,520,517 A | 5/1996 | Sipin |
| 5,528,120 A | 6/1996 | Brodetsky |
| 5,532,635 A | 7/1996 | Watrous |
| 5,540,555 A | 7/1996 | Corso |
| D372,719 S | 8/1996 | Jensen |
| 5,545,012 A | 8/1996 | Anastos |
| 5,548,854 A | 8/1996 | Bloemer |
| 5,549,456 A | 8/1996 | Burrill |
| 5,550,497 A | 8/1996 | Carobolante |
| 5,550,753 A | 8/1996 | Tompkins |
| 5,559,418 A | 9/1996 | Burkhart |
| 5,559,720 A | 9/1996 | Tompkins |
| 5,559,762 A | 9/1996 | Sakamoto |
| 5,561,357 A | 10/1996 | Schroeder |
| 5,563,759 A | 10/1996 | Nadd |
| D375,908 S | 11/1996 | Schumaker |
| 5,570,481 A | 11/1996 | Mathis |
| 5,571,000 A | 11/1996 | Zimmermann |
| 5,577,890 A | 11/1996 | Nielsen |
| 5,580,221 A | 12/1996 | Triezenberg |
| 5,589,753 A | 12/1996 | Kadah |
| 5,592,062 A | 1/1997 | Bach |
| 5,598,080 A | 1/1997 | Jensen |
| 5,601,413 A | 2/1997 | Langley |
| 5,604,491 A | 2/1997 | Coonley |
| 5,614,812 A | 3/1997 | Wagoner |
| 5,616,239 A | 4/1997 | Wendell et al. |
| 5,618,460 A | 4/1997 | Fowler |
| 5,624,237 A | 4/1997 | Prescott et al. |
| 5,626,464 A | 5/1997 | Schoenmeyr |
| 5,628,896 A | 5/1997 | Klingenberger |
| 5,632,468 A | 5/1997 | Schoenmeyr |
| 5,633,540 A | 5/1997 | Moan |
| 5,654,504 A | 8/1997 | Smith |
| 5,654,620 A | 8/1997 | Langhorst |
| 5,672,050 A | 9/1997 | Webber |
| 5,682,624 A | 11/1997 | Ciochetti |
| 5,690,476 A | 11/1997 | Miller |
| 5,711,483 A | 1/1998 | Hays |
| 5,713,320 A | 2/1998 | Pfaff |
| 5,727,933 A | 3/1998 | Laskaris |
| 5,730,861 A | 3/1998 | Sterghos |
| 5,731,673 A | 3/1998 | Gilmore |
| 5,736,884 A | 4/1998 | Ettes et al. |
| 5,739,648 A | 4/1998 | Ellis |
| 5,744,921 A | 4/1998 | Makaran |
| 5,754,036 A | 5/1998 | Walker |
| 5,754,421 A | 5/1998 | Nystrom |
| 5,767,606 A | 6/1998 | Bresolin |
| 5,777,833 A | 7/1998 | Romillon |
| 5,791,882 A | 8/1998 | Stucker |
| 5,804,080 A | 9/1998 | Klingenberger |
| 5,808,441 A | 9/1998 | Nehring |
| 5,814,966 A | 9/1998 | Williamson |
| 5,818,708 A | 10/1998 | Wong |
| 5,818,714 A | 10/1998 | Zou |
| 5,819,848 A | 10/1998 | Rasmuson |
| 5,820,350 A | 10/1998 | Mantey |
| 5,828,200 A | 10/1998 | Ligman |
| 5,833,437 A | 11/1998 | Kurth |
| 5,836,271 A | 11/1998 | Sasaki |
| 5,856,783 A | 1/1999 | Gibb |
| 5,863,185 A | 1/1999 | Cochimin et al. |
| 5,883,489 A | 3/1999 | Konrad |
| 5,892,349 A | 4/1999 | Bogwicz |
| 5,894,609 A | 4/1999 | Barnett |
| 5,898,958 A | 5/1999 | Hall |
| 5,907,281 A | 5/1999 | Miller, Jr. |
| 5,909,352 A | 6/1999 | Klabunde |
| 5,909,372 A | 6/1999 | Thybo |
| 5,914,881 A | 6/1999 | Trachier |
| 5,920,264 A | 7/1999 | Kim |
| 5,930,092 A | 7/1999 | Nystrom |
| 5,941,690 A * | 8/1999 | Lin ............................. 417/44.2 |
| 5,945,802 A | 8/1999 | Konrad |
| 5,947,689 A | 9/1999 | Schick |
| 5,947,700 A | 9/1999 | McKain |
| 5,959,534 A | 9/1999 | Campbell |
| 5,961,291 A | 10/1999 | Sakagami |
| 5,969,958 A | 10/1999 | Nielsen |
| 5,973,465 A | 10/1999 | Rayner |
| 5,973,473 A | 10/1999 | Anderson |
| 5,977,732 A | 11/1999 | Matsumoto |

(56) References Cited

U.S. PATENT DOCUMENTS

| | | | |
|---|---|---|---|
| 5,983,146 A | 11/1999 | Sarbach | |
| 5,987,105 A | 11/1999 | Jenkins et al. | |
| 5,991,939 A | 11/1999 | Mulvey | |
| 6,030,180 A | 2/2000 | Clarey | |
| 6,037,742 A | 3/2000 | Rasmussen | |
| 6,043,461 A | 3/2000 | Holling | |
| 6,045,331 A * | 4/2000 | Gehm et al. | 417/2 |
| 6,045,333 A | 4/2000 | Breit | |
| 6,046,492 A | 4/2000 | Machida | |
| 6,048,183 A | 4/2000 | Meza | |
| 6,059,536 A | 5/2000 | Stingl | |
| 6,065,946 A | 5/2000 | Lathrop | |
| 6,072,291 A | 6/2000 | Pedersen | |
| 6,081,751 A | 6/2000 | Luo | |
| 6,091,604 A | 7/2000 | Plougsgaard | |
| 6,092,992 A | 7/2000 | Imblum | |
| D429,699 S | 8/2000 | Davis | |
| D429,700 S | 8/2000 | Liebig | |
| 6,098,654 A | 8/2000 | Cohen | |
| 6,102,665 A | 8/2000 | Centers | |
| 6,110,322 A | 8/2000 | Teoh | |
| 6,116,040 A | 9/2000 | Stark | |
| 6,121,746 A | 9/2000 | Fisher | |
| 6,125,481 A | 10/2000 | Sicilano | |
| 6,142,741 A | 11/2000 | Nishihata | |
| 6,157,304 A | 12/2000 | Bennett | |
| 6,164,132 A | 12/2000 | Matulek | |
| 6,171,073 B1 | 1/2001 | McKain | |
| 6,178,393 B1 | 1/2001 | Irvin | |
| 6,199,224 B1 | 3/2001 | Versland | |
| 6,208,112 B1 | 3/2001 | Jensen | |
| 6,212,956 B1 | 4/2001 | Donald | |
| 6,213,724 B1 | 4/2001 | Haugen | |
| 6,216,814 B1 | 4/2001 | Fujita et al. | |
| 6,222,355 B1 | 4/2001 | Ohshima | |
| 6,227,808 B1 | 5/2001 | McDonough | |
| 6,232,742 B1 | 5/2001 | Wacknov | |
| 6,236,177 B1 | 5/2001 | Zick | |
| 6,238,188 B1 | 5/2001 | Lifson | |
| 6,247,429 B1 | 6/2001 | Hara | |
| 6,249,435 B1 | 6/2001 | Vicente | |
| 6,251,285 B1 | 6/2001 | Clochetti | |
| 6,253,227 B1 | 6/2001 | Tompkins | |
| D445,405 S | 7/2001 | Schneider | |
| 6,254,353 B1 | 7/2001 | Polo | |
| 6,257,304 B1 | 7/2001 | Jacobs | |
| 6,259,617 B1 | 7/2001 | Wu | |
| 6,264,431 B1 | 7/2001 | Triezenberg | |
| 6,264,432 B1 | 7/2001 | Kilayko | |
| 6,280,611 B1 | 8/2001 | Henkin | |
| 6,299,414 B1 | 10/2001 | Schoenmeyr | |
| 6,299,699 B1 | 10/2001 | Porat | |
| 6,320,348 B1 | 11/2001 | Kadah | |
| 6,326,752 B1 | 12/2001 | Jensen | |
| 6,329,784 B1 | 12/2001 | Puppin | |
| 6,330,525 B1 | 12/2001 | Hays | |
| 6,342,841 B1 | 1/2002 | Stingl | |
| 6,349,268 B1 | 2/2002 | Ketonen | |
| 6,350,105 B1 | 2/2002 | Kobayashi | |
| 6,351,359 B1 | 2/2002 | Jæger | |
| 6,354,805 B1 | 3/2002 | Møller | |
| 6,356,464 B1 | 3/2002 | Balakrishnan | |
| 6,362,591 B1 | 3/2002 | Moberg | |
| 6,364,621 B1 | 4/2002 | Yamauchi | |
| 6,366,481 B1 | 4/2002 | Balakrishnan | |
| 6,373,204 B1 | 4/2002 | Peterson | |
| 6,373,728 B1 | 4/2002 | Aarestrup | |
| 6,374,854 B1 | 4/2002 | Acosta | |
| 6,380,707 B1 | 4/2002 | Rosholm | |
| 6,388,642 B1 | 5/2002 | Cotis | |
| 6,390,781 B1 | 5/2002 | McDonough | |
| 6,406,265 B1 | 6/2002 | Hahn | |
| 6,411,481 B1 | 6/2002 | Seubert | |
| 6,415,808 B2 | 7/2002 | Joshi | |
| 6,416,295 B1 | 7/2002 | Nagai | |
| 6,426,633 B1 | 7/2002 | Thybo | |
| 6,445,565 B1 | 9/2002 | Toyoda et al. | |
| 6,447,446 B1 | 9/2002 | Smith | |
| 6,448,713 B1 | 9/2002 | Farkas et al. | |
| 6,450,771 B1 | 9/2002 | Centers | |
| 6,462,971 B1 | 10/2002 | Balakrishnan et al. | |
| 6,464,464 B2 | 10/2002 | Sabini | |
| 6,468,042 B2 | 10/2002 | Møller | |
| 6,468,052 B2 | 10/2002 | McKain | |
| 6,474,949 B1 | 11/2002 | Arai | |
| 6,481,973 B1 | 11/2002 | Struthers | |
| 6,483,278 B2 | 11/2002 | Harvest | |
| 6,483,378 B2 | 11/2002 | Blodgett | |
| 6,490,920 B1 | 12/2002 | Netzer | |
| 6,493,227 B2 | 12/2002 | Nielsen | |
| 6,496,392 B2 | 12/2002 | Odel | |
| 6,499,961 B1 | 12/2002 | Wyatt | |
| 6,501,629 B1 | 12/2002 | Marriott | |
| 6,504,338 B1 | 1/2003 | Eichorn | |
| 6,520,010 B1 | 2/2003 | Bergveld | |
| 6,522,034 B1 | 2/2003 | Nakayama | |
| 6,523,091 B2 | 2/2003 | Tirumala | |
| 6,534,940 B2 | 3/2003 | Bell | |
| 6,534,947 B2 | 3/2003 | Johnson | |
| 6,537,032 B1 | 3/2003 | Horiuchi | |
| 6,538,908 B2 | 3/2003 | Balakrishnan et al. | |
| 6,539,797 B2 | 4/2003 | Livingston | |
| 6,543,940 B2 | 4/2003 | Chu | |
| 6,548,976 B2 | 4/2003 | Jensen | |
| 6,571,807 B2 | 6/2003 | Jones | |
| 6,590,188 B2 | 7/2003 | Cline | |
| 6,591,697 B2 | 7/2003 | Henyan | |
| 6,591,863 B2 | 7/2003 | Ruschell | |
| 6,595,762 B2 | 7/2003 | Khanwilkar et al. | |
| 6,604,909 B2 | 8/2003 | Schoenmeyr | |
| 6,607,360 B2 | 8/2003 | Fong | |
| 6,616,413 B2 | 9/2003 | Humpheries | |
| 6,623,245 B2 | 9/2003 | Meza | |
| 6,626,840 B2 | 9/2003 | Drzewiecki | |
| 6,628,501 B2 | 9/2003 | Toyoda | |
| 6,636,135 B1 | 10/2003 | Vetter | |
| 6,638,023 B2 | 10/2003 | Scott | |
| D482,664 S | 11/2003 | Hunt | |
| 6,643,153 B2 | 11/2003 | Balakrishnan | |
| 6,651,900 B1 | 11/2003 | Yoshida | |
| 6,665,200 B2 | 12/2003 | Goto | |
| 6,672,147 B1 | 1/2004 | Mazet | |
| 6,675,912 B2 | 1/2004 | Carrier | |
| 6,676,831 B2 | 1/2004 | Wolfe | |
| 6,687,141 B2 | 2/2004 | Odell | |
| 6,687,923 B2 | 2/2004 | Dick | |
| 6,690,250 B2 | 2/2004 | Møller | |
| 6,696,676 B1 | 2/2004 | Graves | |
| 6,700,333 B1 | 3/2004 | Hirshi et al. | |
| 6,709,240 B1 | 3/2004 | Schmalz | |
| 6,709,241 B2 | 3/2004 | Sabini | |
| 6,709,575 B1 | 3/2004 | Verdegan | |
| 6,715,996 B2 | 4/2004 | Moeller | |
| 6,717,318 B1 | 4/2004 | Mathiassen | |
| 6,732,387 B1 | 5/2004 | Waldron | |
| 6,737,905 B1 | 5/2004 | Noda | |
| D490,726 S | 6/2004 | Eungprabhanth | |
| 6,742,387 B2 | 6/2004 | Hamamoto | |
| 6,747,367 B2 | 6/2004 | Cline | |
| 6,761,067 B1 | 7/2004 | Capano | |
| 6,768,279 B1 | 7/2004 | Skinner | |
| 6,770,043 B1 | 8/2004 | Kahn | |
| 6,774,664 B2 | 8/2004 | Godbersen | |
| 6,776,584 B2 | 8/2004 | Sabini | |
| 6,778,868 B2 | 8/2004 | Imamura et al. | |
| 6,779,205 B2 | 8/2004 | Mulvey | |
| 6,782,309 B2 | 8/2004 | Laflamme et al. | |
| 6,783,328 B2 | 8/2004 | Lucke et al. | |
| 6,794,921 B2 | 9/2004 | Abe | |
| 6,797,164 B2 | 9/2004 | Leaverton | |
| 6,798,271 B2 | 9/2004 | Swize | |
| 6,799,950 B2 | 10/2004 | Meier | |
| 6,806,677 B2 | 10/2004 | Kelly | |
| 6,837,688 B2 | 1/2005 | Kimberlin | |

(56) References Cited

U.S. PATENT DOCUMENTS

| | | |
|---|---|---|
| 6,842,117 B2 | 1/2005 | Keown |
| 6,847,854 B2 | 1/2005 | Discenzo |
| 6,863,502 B2 | 3/2005 | Bishop |
| 6,875,961 B1 | 4/2005 | Collins |
| 6,882,165 B2 | 4/2005 | Ogura |
| 6,884,022 B2 | 4/2005 | Albright |
| D504,900 S | 5/2005 | Wang |
| D505,429 S | 5/2005 | Wang |
| 6,888,537 B2 | 5/2005 | Benson |
| 6,895,608 B2 | 5/2005 | Goettl |
| 6,900,736 B2 | 5/2005 | Crumb |
| 6,906,482 B2 | 6/2005 | Shimizu |
| D507,243 S | 7/2005 | Miller |
| 6,914,793 B2 | 7/2005 | Balakrishnan |
| 6,922,348 B2 | 7/2005 | Nakajima et al. |
| 6,925,823 B2 | 8/2005 | Lifson |
| 6,933,693 B2 | 8/2005 | Schuchmann |
| 6,941,785 B2 | 9/2005 | Haynes |
| 6,943,325 B2 | 9/2005 | Pittman et al. |
| D511,530 S | 11/2005 | Wang |
| D512,026 S | 11/2005 | Nurmi |
| 6,965,815 B1 | 11/2005 | Tompkins |
| 6,966,967 B2 | 11/2005 | Curry |
| D512,440 S | 12/2005 | Wang |
| 6,973,794 B2 | 12/2005 | Street et al. |
| 6,973,974 B2 | 12/2005 | McLoughlin et al. |
| 6,976,052 B2 | 12/2005 | Tompkins |
| D513,737 S | 1/2006 | Riley |
| 6,981,399 B1 | 1/2006 | Nybo |
| 6,981,402 B2 | 1/2006 | Bristol |
| 6,984,158 B2 | 1/2006 | Satoh |
| 6,989,649 B2 | 1/2006 | Mehlhorn |
| 6,993,414 B2 | 1/2006 | Shah |
| 6,998,807 B2 | 2/2006 | Phillips |
| 7,005,818 B2 | 2/2006 | Jensen |
| 7,040,107 B2 | 5/2006 | Lee |
| 7,042,192 B2 | 5/2006 | Mehlhorn |
| 7,050,278 B2 | 5/2006 | Poulsen |
| 7,055,189 B2 | 6/2006 | Goettl |
| 7,070,134 B1 | 7/2006 | Hoyer |
| 7,077,781 B2 | 7/2006 | Ishikawa |
| 7,080,508 B2 | 7/2006 | Stavale |
| 7,083,392 B2 | 8/2006 | Meza |
| 7,089,607 B2 | 8/2006 | Barnes et al. |
| 7,114,926 B2 | 10/2006 | Oshita |
| 7,117,120 B2 | 10/2006 | Beck |
| 7,141,210 B2 | 11/2006 | Bell |
| 7,142,932 B2 | 11/2006 | Spira et al. |
| D533,512 S | 12/2006 | Nakashima |
| 7,163,380 B2 | 1/2007 | Jones |
| 7,178,179 B2 | 2/2007 | Barnes |
| 7,183,741 B2 | 2/2007 | Mehlhorn |
| 7,195,462 B2 | 3/2007 | Nybo et al. |
| 7,221,121 B2 | 5/2007 | Skaug |
| 7,244,106 B2 | 7/2007 | Kallman |
| 7,245,105 B2 | 7/2007 | Joo |
| 7,292,898 B2 | 11/2007 | Clark et al. |
| 7,318,344 B2 | 1/2008 | Heger |
| D562,349 S | 2/2008 | Bülter |
| 7,327,275 B2 | 2/2008 | Brochu |
| D567,189 S | 4/2008 | Stiles, Jr. |
| 7,352,550 B2 | 4/2008 | Mladenik |
| 7,407,371 B2 | 8/2008 | Leone et al. |
| 7,427,844 B2 | 9/2008 | Mehlhorn |
| 7,437,215 B2 | 10/2008 | Anderson et al. |
| D582,797 S | 12/2008 | Fraser |
| D583,828 S | 12/2008 | Li |
| 7,484,938 B2 | 2/2009 | Allen |
| 7,516,106 B2 | 4/2009 | Ehlers et al. |
| 7,542,251 B2 | 6/2009 | Ivankovic |
| 7,572,108 B2 | 8/2009 | Koehl |
| 7,612,510 B2 | 11/2009 | Koehl |
| 7,623,986 B2 | 11/2009 | Miller |
| 7,641,449 B2 | 1/2010 | Iimura et al. |
| 7,652,441 B2 | 1/2010 | Ho |
| 7,686,587 B2 | 3/2010 | Koehl |
| 7,686,589 B2 | 3/2010 | Stiles, Jr. et al. |
| 7,690,897 B2 | 4/2010 | Branecky |
| 7,704,051 B2 | 4/2010 | Koehl |
| 7,727,181 B2 | 6/2010 | Rush |
| 7,739,733 B2 | 6/2010 | Szydlo |
| 7,751,159 B2 | 7/2010 | Koehl |
| 7,775,327 B2 | 8/2010 | Abraham et al. |
| 7,777,435 B2 | 8/2010 | Aguilar |
| 7,815,420 B2 | 10/2010 | Koehl |
| 7,821,215 B2 | 10/2010 | Koehl |
| 7,845,913 B2 | 12/2010 | Stiles, Jr. et al. |
| 7,854,597 B2 | 12/2010 | Stiles, Jr. et al. |
| 7,857,600 B2 | 12/2010 | Koehl |
| 7,874,808 B2 | 1/2011 | Stiles |
| 7,878,766 B2 | 2/2011 | Meza |
| 7,900,308 B2 | 3/2011 | Erlich |
| 7,925,385 B2 | 4/2011 | Stavale et al. |
| 7,931,447 B2 | 4/2011 | Levin et al. |
| 7,945,411 B2 | 5/2011 | Kernan et al. |
| 7,976,284 B2 | 7/2011 | Koehl |
| 7,983,877 B2 | 7/2011 | Koehl |
| 7,990,091 B2 | 8/2011 | Koehl |
| 8,011,895 B2 | 9/2011 | Ruffo |
| 8,019,479 B2 | 9/2011 | Stiles, Jr. et al. |
| 8,043,070 B2 | 10/2011 | Stiles, Jr. et al. |
| 8,104,110 B2 | 1/2012 | Caudill et al. |
| 8,126,574 B2 | 2/2012 | Discenzo et al. |
| 8,133,034 B2 | 3/2012 | Mehlhorn et al. |
| 8,177,520 B2 | 5/2012 | Mehlhorn |
| 8,281,425 B2 | 10/2012 | Cohen |
| 8,303,260 B2 | 11/2012 | Stavale et al. |
| 8,313,306 B2 | 11/2012 | Stiles, Jr. et al. |
| 8,317,485 B2 | 11/2012 | Meza et al. |
| 8,337,166 B2 | 12/2012 | Meza et al. |
| 8,444,394 B2 | 5/2013 | Koehl |
| 8,465,262 B2 | 6/2013 | Stiles, Jr. et al. |
| 8,469,675 B2 | 6/2013 | Stiles, Jr. et al. |
| 8,480,373 B2 | 7/2013 | Stiles, Jr. et al. |
| 8,500,413 B2 | 8/2013 | Stiles et al. |
| 8,540,493 B2 | 9/2013 | Koehl |
| 8,573,952 B2 | 11/2013 | Stiles, Jr. et al. |
| 8,602,745 B2 | 12/2013 | Stiles, Jr. et al. |
| 8,641,383 B2 | 2/2014 | Meza et al. |
| 8,641,385 B2 | 2/2014 | Koehl |
| 8,669,494 B2 | 3/2014 | Tran |
| 8,763,315 B2 | 7/2014 | Hartman |
| 8,774,972 B2 | 7/2014 | Rusnak |
| 2001/0002238 A1 | 5/2001 | McKain |
| 2001/0029407 A1 | 10/2001 | Tompkins |
| 2001/0041139 A1 | 11/2001 | Sabini |
| 2002/0002989 A1 | 1/2002 | Jones |
| 2002/0010839 A1 | 1/2002 | Tirumala et al. |
| 2002/0018721 A1 | 2/2002 | Kobayashi |
| 2002/0032491 A1 | 3/2002 | Imamura et al. |
| 2002/0035403 A1 | 3/2002 | Clark et al. |
| 2002/0050490 A1 | 5/2002 | Pittman |
| 2002/0070875 A1 | 6/2002 | Crumb |
| 2002/0082727 A1 | 6/2002 | Laflamme et al. |
| 2002/0089236 A1 | 7/2002 | Cline |
| 2002/0093306 A1 | 7/2002 | Johnson |
| 2002/0101193 A1 | 8/2002 | Farkas |
| 2002/0111554 A1 | 8/2002 | Drzewiecki |
| 2002/0131866 A1 | 9/2002 | Phillips |
| 2002/0136642 A1 | 9/2002 | Moller |
| 2002/0150476 A1 | 10/2002 | Lucke |
| 2002/0163821 A1 | 11/2002 | Odell |
| 2002/0172055 A1 | 11/2002 | Balakrishnan |
| 2002/0176783 A1 | 11/2002 | Moeller |
| 2002/0190687 A1 | 12/2002 | Bell |
| 2003/0000303 A1 | 1/2003 | Livingston |
| 2003/0017055 A1 | 1/2003 | Fong |
| 2003/0034284 A1 | 2/2003 | Wolfe |
| 2003/0034761 A1 | 2/2003 | Goto |
| 2003/0048646 A1 | 3/2003 | Odell |
| 2003/0061004 A1 | 3/2003 | Discenzo |
| 2003/0063900 A1 | 4/2003 | Wang |
| 2003/0099548 A1 | 5/2003 | Meza |
| 2003/0106147 A1 | 6/2003 | Cohen |

(56) References Cited

U.S. PATENT DOCUMENTS

| | | |
|---|---|---|
| 2003/0174450 A1 | 9/2003 | Nakajima et al. |
| 2003/0186453 A1 | 10/2003 | Bell |
| 2003/0196942 A1 | 10/2003 | Jones |
| 2004/0000525 A1 | 1/2004 | Hornsby |
| 2004/0006486 A1 | 1/2004 | Schmidt |
| 2004/0009075 A1 | 1/2004 | Meza |
| 2004/0013531 A1 | 1/2004 | Curry |
| 2004/0016241 A1 | 1/2004 | Street et al. |
| 2004/0025244 A1 | 2/2004 | Loyd |
| 2004/0055363 A1 | 3/2004 | Bristol |
| 2004/0062658 A1 | 4/2004 | Beck |
| 2004/0064292 A1 | 4/2004 | Beck |
| 2004/0071001 A1 | 4/2004 | Balakrishnan |
| 2004/0080325 A1 | 4/2004 | Ogura |
| 2004/0080352 A1 | 4/2004 | Noda |
| 2004/0090197 A1 | 5/2004 | Schuchmann |
| 2004/0095183 A1 | 5/2004 | Swize |
| 2004/0116241 A1 | 6/2004 | Ishikawa |
| 2004/0117330 A1 | 6/2004 | Ehlers et al. |
| 2004/0118203 A1 | 6/2004 | Heger |
| 2004/0149666 A1 | 8/2004 | Leaverton |
| 2004/0205886 A1 | 10/2004 | Goettl |
| 2004/0213676 A1 | 10/2004 | Phillips |
| 2004/0265134 A1 | 12/2004 | Iimura et al. |
| 2005/0050908 A1 | 3/2005 | Lee |
| 2005/0086957 A1 | 4/2005 | Lifson |
| 2005/0095150 A1 | 5/2005 | Leone et al. |
| 2005/0097665 A1 | 5/2005 | Goettl |
| 2005/0123408 A1 | 6/2005 | Koehl |
| 2005/0133088 A1 | 6/2005 | Bologeorges |
| 2005/0137720 A1 | 6/2005 | Spira et al. |
| 2005/0158177 A1 | 7/2005 | Mehlhorn |
| 2005/0167345 A1 | 8/2005 | De Wet et al. |
| 2005/0170936 A1 | 8/2005 | Quinn |
| 2005/0180868 A1 | 8/2005 | Miller |
| 2005/0190094 A1 | 9/2005 | Andersen |
| 2005/0193485 A1 | 9/2005 | Wolfe |
| 2005/0195545 A1 | 9/2005 | Mladenik |
| 2005/0226731 A1 | 10/2005 | Mehlhorn |
| 2005/0235732 A1 | 10/2005 | Rush |
| 2005/0260079 A1 | 11/2005 | Allen |
| 2005/0281681 A1 | 12/2005 | Anderson |
| 2006/0045750 A1 | 3/2006 | Stiles |
| 2006/0045751 A1 | 3/2006 | Beckman |
| 2006/0090255 A1 | 5/2006 | Cohen |
| 2006/0127227 A1 | 6/2006 | Mehlhorn |
| 2006/0138033 A1 | 6/2006 | Hoal |
| 2006/0146462 A1 | 7/2006 | McMillian |
| 2006/0169322 A1 | 8/2006 | Torkelson |
| 2006/0204367 A1 | 9/2006 | Meza |
| 2006/0235573 A1 | 10/2006 | Guion |
| 2007/0001635 A1 | 1/2007 | Ho |
| 2007/0041845 A1 | 2/2007 | Freudenberger |
| 2007/0061051 A1 | 3/2007 | Maddox |
| 2007/0113647 A1 | 5/2007 | Mehlhorn |
| 2007/0114162 A1 | 5/2007 | Stiles |
| 2007/0124321 A1 | 5/2007 | Szydlo |
| 2007/0154319 A1 | 7/2007 | Stiles |
| 2007/0154320 A1 | 7/2007 | Stiles |
| 2007/0154321 A1 | 7/2007 | Stiles |
| 2007/0154322 A1 | 7/2007 | Stiles |
| 2007/0154323 A1 | 7/2007 | Stiles |
| 2007/0160480 A1 | 7/2007 | Ruffo |
| 2007/0163929 A1 | 7/2007 | Stiles |
| 2007/0183902 A1 | 8/2007 | Stiles |
| 2007/0187185 A1 | 8/2007 | Abraham et al. |
| 2007/0212210 A1 | 9/2007 | Kernan et al. |
| 2007/0212229 A1 | 9/2007 | Stavale et al. |
| 2007/0212230 A1 | 9/2007 | Stavale et al. |
| 2008/0003114 A1 | 1/2008 | Levin et al. |
| 2008/0039977 A1 | 2/2008 | Clark |
| 2008/0041839 A1 | 2/2008 | Tran |
| 2008/0063535 A1 | 3/2008 | Koehl |
| 2008/0095638 A1 | 4/2008 | Branecky |
| 2008/0095639 A1 | 4/2008 | Bartos |
| 2008/0131286 A1 | 6/2008 | Koehl |
| 2008/0131289 A1 | 6/2008 | Koehl |
| 2008/0131291 A1 | 6/2008 | Koehl |
| 2008/0131294 A1 | 6/2008 | Koehl |
| 2008/0131295 A1 | 6/2008 | Koehl |
| 2008/0131296 A1 | 6/2008 | Koehl |
| 2008/0140353 A1 | 6/2008 | Koehl |
| 2008/0152508 A1 | 6/2008 | Meza |
| 2008/0168599 A1 | 7/2008 | Caudill |
| 2008/0181785 A1 | 7/2008 | Koehl |
| 2008/0181786 A1 | 7/2008 | Meza |
| 2008/0181787 A1 | 7/2008 | Koehl |
| 2008/0181788 A1 | 7/2008 | Meza |
| 2008/0181789 A1 | 7/2008 | Koehl |
| 2008/0181790 A1 | 7/2008 | Meza |
| 2008/0189885 A1 | 8/2008 | Erlich |
| 2008/0260540 A1 | 10/2008 | Koehl |
| 2008/0288115 A1 | 11/2008 | Rusnak |
| 2009/0014044 A1 | 1/2009 | Hartman |
| 2009/0038696 A1 | 2/2009 | Levin et al. |
| 2009/0052281 A1 | 2/2009 | Nybo |
| 2009/0104044 A1 | 4/2009 | Koehl |
| 2009/0143917 A1 | 6/2009 | Uy et al. |
| 2009/0204237 A1 | 8/2009 | Sustaeta |
| 2009/0204267 A1 | 8/2009 | Sustaeta |
| 2009/0210081 A1 | 8/2009 | Sustaeta |
| 2010/0306001 A1 | 12/2010 | Discenzo |
| 2011/0044823 A1 | 2/2011 | Stiles |
| 2011/0052416 A1 | 3/2011 | Stiles |
| 2011/0280744 A1 | 11/2011 | Ortiz et al. |
| 2012/0020810 A1 | 1/2012 | Stiles, Jr. et al. |
| 2012/0100010 A1 | 4/2012 | Stiles et al. |

FOREIGN PATENT DOCUMENTS

| | | |
|---|---|---|
| AU | 2007332716 A1 | 6/2008 |
| AU | 2007332769 A1 | 6/2008 |
| CA | 2548437 A1 | 6/2005 |
| CA | 2731482 A1 | 6/2005 |
| CA | 2517040 A1 | 2/2006 |
| CA | 2528580 A1 | 5/2007 |
| CA | 2672410 A1 | 6/2008 |
| CA | 2672459 A1 | 6/2008 |
| CN | 101165352 | 4/2008 |
| DE | 2946049 A1 | 5/1981 |
| DE | 19645129 | 5/1998 |
| DE | 29724347 U1 | 11/2000 |
| DE | 19938490 | 3/2001 |
| DE | 10231773 | 2/2004 |
| DE | 19938490 | 4/2005 |
| EP | 0150068 A1 | 7/1985 |
| EP | 0226858 A1 | 7/1987 |
| EP | 0314249 | 5/1989 |
| EP | 0709575 | 5/1996 |
| EP | 0735273 | 10/1996 |
| EP | 0978657 | 2/2000 |
| EP | 0916026 A1 | 5/2002 |
| EP | 1315929 A1 | 6/2003 |
| EP | 1585205 A2 | 10/2005 |
| EP | 1630422 A2 | 3/2006 |
| EP | 1698815 A1 | 9/2006 |
| EP | 1790858 A1 | 5/2007 |
| EP | 1995462 A1 | 11/2008 |
| EP | 2102503 A1 | 9/2009 |
| EP | 2122171 A1 | 11/2009 |
| EP | 2122172 A1 | 11/2009 |
| EP | 2273125 A1 | 1/2011 |
| FR | 2529965 | 6/1983 |
| FR | 2703409 | 10/1994 |
| JP | 55072678 A | 5/1980 |
| JP | 5010270 | 1/1993 |
| MX | 2009006258 A1 | 12/2009 |
| WO | 98/04835 | 2/1998 |
| WO | 01/27508 A1 | 4/2001 |
| WO | 0147099 | 6/2001 |
| WO | 02/18826 A1 | 3/2002 |
| WO | 03/025442 A1 | 3/2003 |
| WO | 2004/006416 | 1/2004 |
| WO | 2004/088694 | 10/2004 |

(56) References Cited

FOREIGN PATENT DOCUMENTS

| | | |
|---|---|---|
| WO | 2005/011473 A1 | 2/2005 |
| WO | 2005/011473 A2 | 2/2005 |
| WO | 2005/055694 A1 | 6/2005 |
| WO | 2005/111473 A3 | 11/2005 |
| WO | 2006/069568 | 7/2006 |
| WO | 2008/073329 A1 | 6/2008 |
| WO | 2008/073330 A1 | 6/2008 |
| WO | 2008/073386 A1 | 6/2008 |
| WO | 2008/073413 A1 | 6/2008 |
| WO | 2008/073418 A1 | 6/2008 |
| WO | 2008/073433 A1 | 6/2008 |
| WO | 2008/073436 A1 | 6/2008 |
| ZA | 200506869 A1 | 5/2006 |
| ZA | 200509691 A1 | 11/2006 |
| ZA | 200904747 A1 | 7/2010 |
| ZA | 200904849 A1 | 7/2010 |
| ZA | 200904850 A1 | 7/2010 |

OTHER PUBLICATIONS

Docket Report for Case No. 5:11-cv-00459-D; Nov. 2012.
1—Complaint Filed by Pentair Water Pool & Spa, Inc. and Danfoss Drives A/S with respect to Civil Action No. 5:11-cv-00459-D; Aug. 31, 2011.
7—Motion for Preliminary Injunction by Danfoss Drives A/S & Pentair Water Pool & Spa, Inc. with respect to Civil Action No. 5:11-cv-00459-D; Sep. 30, 2011.
22—Memorandum in Support of Motion for Preliminary Injunction by Plaintiffs with respect to Civil Action 5:11-cv-00459-D; Sep. 2, 2011.
23—Declaration of E. Randolph Collins, Jr. in Support of Motion for Preliminary Injunction with respect to Civil Action 5:11-cv-00459-D; Sep. 30, 2011.
24—Declaration of Zack Picard in Support of Motion for Preliminary Injunction with respect to Civil Action 5:11-cv-00459-D; Sep. 30, 2011.
32—Answer to Complaint with Jury Demand & Counterclaim Against Plaintiffs by Hayward Pool Products & Hayward Industries for Civil Action 5:11-cv-00459-D; Oct. 12, 2011.
45—Plaintiffs' Reply to Defendants' Answer to Complaint & Counterclaim for Civil Action 5:11-cv-00459D; Nov. 2, 2011.
50—Amended Answer to Complaint & Counterclaim by Defendants for Civil Action 5:11-cv-00459D; Nov. 23, 2011.
51—Response by Defendants in Opposition to Motion for Preliminary Injunction for Civil Action 5:11-cv-00459D; Dec. 2, 2011.
53—Declaration of Douglas C. Hopkins & Exhibits re Response Opposing Motion for Preliminary Injunction for Civil Action 5:11-cv-00459D; Dec. 2, 2011.
89—Reply to Response to Motion for Preliminary Injunction Filed by Danfoss Drives A/S & Pentair Water Pool & Spa, Inc. for Civil Action 5:11-cv-00459D; Jan. 3, 2012.
105—Declaration re Memorandum in Opposition, Declaration of Lars Hoffmann Berthelsen for Civil Action 5:11-cv-00459D; Jan. 11, 2012.
112—Amended Complaint Against All Defendants, with Exhibits for Civil Action 5:11-cv-00459D; Jan. 17, 2012.
119—Order Denying Motion for Preliminary Injunction for Civil Action 5:11-cv-00459D; Jan. 23, 2012.
123—Answer to Amended Complaint, Counterclaim Against Danfoss Drives A/S, Pentair Water Pool & Spa, Inc. for Civil Action 5:11-cv-00459D; Jan. 27, 2012.
152—Order Denying Motion for Reconsideration for Civil Action 5:11-cv-00459D; Apr. 4, 2012.
168—Amended Motion to Stay Action Pending Reexamination of Asserted Patents by Defendants for Civil Action 5:11-cv-00459D; Jun. 13, 2012.
174—Notice and Attachments re Joint Claim Construction Statement for Civil Action 5:11-cv-00459D; Jun. 5, 2012.
186—Order Setting Hearings—Notice of Markman Hearing Set for Oct. 17, 2012 for Civil Action 5:11-cv-00459D; Jul. 12, 2012.
204—Response by Plaintiffs Opposing Amended Motion to Stay Action Pending Reexamination of Asserted Patents for Civil Action 5:11-cv-00459D; Jul. 2012.
210—Order Granting Joint Motion for Leave to Enlarge Page Limit for Civil Action 15:11-cv-00459D; Jul. 2012.
218—Notice re Plaintiffs re Order on Motion for Leave to File Excess Pages re Amended Joint Claim Construction Statement for Civil Action 5:11-cv-00459D; Aug. 2012.
54DX16—Hayward EcoStar Technical Guide (Version2); 2011; pp. 1-51; cited in Civil Action 5:11-cv-00459D.
54DX17—Hayward ProLogic Automation & Chlorination Operation Manual (Rev. F); pp. 1-27; Elizabeth, NJ; cited in Civil Action 5:11-cv-00459D; Dec. 2, 2011.
54DX18—STMicroelectronics; "AN1946—Sensorless BLDC Motor Control & BEMF Sampling Methods with ST7MC;" 2007; pp. 1-35; Civil Action 5:11-cv-00459D.
54DX19—STMicroelectronics; "AN1276 BLDC Motor Start Routine for ST72141 Microcontroller;" 2000; pp. 1-18; cited in Civil Action 5:11-cv-00459D.
54DX21—Danfoss; "VLT 8000 Aqua Instruction Manual;" Apr. 2004; 1-210; Cited in Civil Action 5:11-cv-00459D.
54DX22—Danfoss; "VLT 8000 Aqua Instruction Manual;" pp. 1-35; cited in Civil Action 5:11-cv-00459D; Dec. 2, 2011.
54DX23—Commander; "Commander SE Advanced User Guide;" Nov. 2002; pp. 1-190; cited in Civil Action 5:11-cv-00459D.
54DX30—Sabbagh et al.; "A Model for Optimal . . . Control of Pumping Stations in Irrigation Systems;" Jul. 1988; NL pp. 119-133; Civil Action 5:11-cv-00459D.
54DX31—Danfoss; "VLT 5000 FLUX Aqua DeviceNet Instruction Manual;" Apr. 28, 2003; pp. 1-39; cited in Civil Action 5:11-cv-00459D.
54DX32—Danfoss; "VLT 5000 FLUX Aqua Profibus Operating Instructions;" May 22, 2003; 1-64; cited in Civil Action 5:11-cv-00459D.
54DX33—Pentair; "IntelliTouch Owner's Manual Set-Up & Programming;" May 22, 2003; Sanford, NC; pp. 1-61; cited in Civil Action 5:11-cv-00459D.
54DX34—Pentair; "Compool 3800 Pool-Spa Control System Installation & Operating Instructions;" Nov. 7, 1997; pp. 1-45; cited in Civil Action 5:11-cv-00459D.
54DX35—Pentair Advertisement in "Pool & Spa News;" Mar. 22, 2002; pp. 1-3; cited in Civil Action 5:11-cv-00459D.
54DX36—Hayward; "Pro-Series High-Rate Sand Filter Owner's Guide;" 2002; Elizabeth, NJ; pp. 1-5; cited in Civil Action 5:11-cv-00459D.
54DX37—Danfoss; "VLT 8000 Aqua Fact Sheet;" Jan. 2002; pp. 1-3; cited in Civil Action 5:11-cv-00459D.
54DX38—Danfoss; "VLT 6000 Series Installation, Operation & Maintenance Manual;" Mar. 2000; pp. 1-118; cited in Civil Action 5:11-cv-00459D.
54DX45—Hopkins; "Synthesis of New Class of Converters that Utilize Energy Recirculation;" pp. 1-7; cited in Civil Action 5:11-cv-00459D; 1994.
54DX46—Hopkins; "High-Temperature, High-Density . . . Embedded Operation;" pp. 1-8; cited in Civil Action 5:11-cv-00459D; Mar. 2006.
54DX47—Hopkins; "Optimally Selecting Packaging Technologies . . . Cost & Performance;" pp. 1-9; cited in Civil Action 5:11-cv-00459D; Jun. 1999.
54DX48—Hopkins: "Partitioning Digitally . . . Applications to Ballasts;" pp. 1-6; cited in Civil Action 5:11-cv-00459D: Mar. 2002.
9PX5—Pentair; Selected Website Pages; pp. 1-29; cited in Civil Action 5: 11-cv-00459D; Sep. 2011.
9PX6—Pentair; "IntelliFlo Variable Speed Pump" Brochure; 2011; pp. 1-9; cited in Civil Action 5:11-cv-00459D.
9PX7—Pentair; "IntelliFlo VF Intelligent Variable Flow Pump;" 2011; pp. 1-9; cited in Civil Action 5:11-cv-00459D.
9PX8—Pentair; "IntelliFlo VS+SVRS Intelligent Variable Speed Pump;" 2011; pp. 1-9; cited in Civil Action 5:11-cv-00459D.
9PX9—STA-RITE; "IntelliPro Variable Speed Pump;" 2011; pp. 1-9; cited in Civil Action 5:11-cv-00459D.
"Understanding Constant Pressure Control;" pp. 1-3; Nov. 1, 1999.

(56) References Cited

OTHER PUBLICATIONS

"Water Pressure Problems" Published Article; The American Well Owner; No. 2, Jul. 2000.
9PX14—Pentair; "IntelliFlo Installation and User's Guide;" pp. 1-53; Jul. 26, 2011; Sanford, NC; cited in Civil Action 5:11-cv-00459D.
9PX16—Hayward Pool Products; "EcoStar Owner's Manual (Rev. B);" pp. 1-32; Elizabeth, NJ; cited in Civil Action 5:11-cv-00459D; 2010.
9PX17—Hayward Pool Products; "EcoStar & EcoStar SVRS Brochure;" pp. 1-7; Elizabeth, NJ; cited in Civil Action 5:11-cv-00459D; Sep. 30, 2011.
9PX19—Hayward Pool Products; "Hayward Energy Solutions Brochure ;" pp. 1-3; www.haywardnet.com; cited in Civil Action 5:11-cv-00459D; Sep. 2011.
9PX20—Hayward Pool Products; "ProLogic Installation Manual (Rev. G);" pp. 1-25; Elizabeth, NJ; cited in Civil Action 5:11-cv-00459D; Sep. 2011.
9PX21—Hayward Pool Products; "ProLogic Operation Manual (Rev. F);" pp. 1-27; Elizabeth, NJ; cited in Civil Action 5:11-cv-00459D; Sep. 2011.
9PX22—Hayward Pool Products; "Wireless & Wired Remote Controls Brochure;" pp. 1-5; 2010; Elizabeth, NJ; cited in Civil Action 5:11-cv-00459D.
9PX23—Hayward Pool Products: Selected Pages from Hayward's Website:/www.hayward-pool.com; pp. 1-27; cited in Civil Action 5:11-cv-00459D; Sep. 2011.
9PX28—Hayward Pool Products; "Selected Page from Hayward's Website Relating to EcoStar Pumps;" p. 1; cited in Civil Action 5:11-cv-00459D; Sep. 2011.
9PX29—Hayward Pool Products; "Selected Page from Hayward's Website Relating to EcoStar SVRS Pumps;" cited in Civil Action 511-cv-00459; Sep. 2011.
9PX30—Hayward Pool Systems; "Selected Pages from Hayward's Website Relating to ProLogic Controllers;" pp. 1-5; Civil Action 5:11-cv-00459D; Sep. 2011.
9PX-42—Hayward Variable Pool Systems; "Hayward EcoStar & EcoStar SVRS Speed Pumps Brochure;" Civil Action 5:11-cv-00459D; 2010.
205-24-Exh23—Plaintiffs Preliminary Disclosure of Asserted Claims and Preliminary Infringement Contentions; cited in Civil Action 5:11-cv-00459; Feb. 21, 2012.
PX-34—Pentair; "IntelliTouch Pool & Spa Control System User's Guide"; pp. 1-129; 2011; cited in Civil Action 5:11-cv-00459; 2011.
PX-138-Deposition of Dr. Douglas C. Hopkins; pp. 1-391; 2011; taken in Civil Action 10-cv-1662.
PX-141—Danfoss; "Whitepaper Automatic Energy Optimization;" pp. 1-4; 2011; cited in Civil Action 5:11-cv-00459.
9PX10—Pentair: "IntelliPro VS+SVRS Intelligent Variable Speed Pump;" 2011; pp. 1-6; cited in Civil Action 5:11-cv-00459D.
9PX11—Pentair; "IntelliTouch Pool & Spa Control Control Systems;" 2011; pp. 1-5; cited in Civil Action 5:11-cv-00459D.
Robert S. Carrow; "Electrician's Technical Reference—Variable Frequency Drives;" 2001; pp. 1-194.
Baldor; "Baldor Motors and Drives Series 14 Vector Drive Control Operating & Technical Manual;" Mar. 22, 1992; pp. 1-92.
Commander; "Commander SE Advanced User Guide:" Nov. 2002; pp. 1-118.
Baldor; "Baldor Series 10 Inverter Control: Installation and Operating Manual"; Feb. 2000; pp. 1-74.
Dinverter; "Dinverter 2B User Guide;" Nov. 1998; pp. 1-94.
Amtrol Inc.; "AMTROL Unearths the Facts About Variable Speed Pumps and Constant Pressure Valves;" pp. 1-5; Aug. 2002; West Warvvick, RI USA.
Bjarke Soerensen; "Have You Chatted With Your Pump Today?" Undated Article Reprinted with Permission of Grundfos Pump University; pp. 1-2; USA.
Compool; "Compool CP3800 Pool-Spa Control System Installation and Operating Instructions;" Nov. 7, 1997; pp. 1-45.

"Constant Pressure is the Name of the Game;" Published Article from National Driller; Mar. 2001.
Danfoss; "Danfoss VLT 6000 Series Adjustable Frequency Drive Installation, Operation and Maintenance Manual;" Mar. 2000; pp. 1-118.
Danfoss; "VLT8000 Aqua Instruction Manual;" Apr. 16, 2004; pp. 1-71.
Email Regarding Grundfos' Price Increases/SQ/SQE Curves; pp. 1-7; Dec. 19, 2001.
Goulds Pumps; "Balanced Flow System Variable Speed Submersible Pump" Specification Sheet; pp. 1-2; Jan. 2000; USA.
Goulds Pumps; "Hydro-Pro Water System Tank Installation, Operation & Maintenance Instructions;" pp. 1-30; Mar. 31, 2001; Seneca Falls, NY USA.
Goulds Pumps; "Pumpsrnart Control Solutions" Advertisement from Industrial Equipment News; Aug. 2002; New York, NY USA.
Goulds Pumps; "Model BFSS List Price Sheet;" Feb. 5, 2001.
Goulds Pumps; "Balanced How System Model BFSS Variable Speed Submersible Pump System" Brochure; pp. 1-4; Jan. 2001; USA.
Goulds Pumps; "Balanced Flow System Model BFSS Variable Speed Submersible Pump" Brochure; pp. 1-3: Jan. 2000; USA.
Goulds Pumps; "Balanced Flow System . . . The Future of Constant Pressure Has Arrived;" Undated Advertisement.
Grundfos; "CU301 Installation & Operation Manual;" Apr. 2009; pp. 1-2; Undated; www.grundfos.com.
Grundfos; "CU301 Installation & Operating Instructions:" Sep. 2005; pp. 1-30; Olathe, KS USA.
Grundfos; "Grundfos SmartFlo SQE Constant Pressure System;" Mar. 2003; pp. 1-2; USA.
Grundfos; "JetPaq—The Complete Pumping System;" Undated Brochure; pp. 1-4; Clovis, CA USA.
Grundfos; "SmartFlo SQE Constant Pressure System;" Mar. 2002; pp. 1-4; Olathe, KS USA.
Grundfos; "SQ/SQE—A New Standard in Submersible Pumps;" Undated Brochure; pp. 1-14; Denmark.
Gfrundfos; "Uncomplicated Electronics . . . Advanced Design;" pp. 1-10; Undated.
Grundfos Pumps Corporation; "Grundfos SQ/SQE Data Book;" pp. 1-39; Jun. 1999; Fresno, CA USA.
Grundfos Pumps Corporation; "The New Standard in Submersible Pumps;" Brochure; pp. 1-8; Jun. 1999; Fresno, CA USA.
Hayward; "Hayward Pro-Series High-Rate Sand Filter Owner's Guide;" 2002; pp. 1-4.
ITT Corporation; "Goulds Pumps Balanced Flow;" Jul. 2006; pp. 1-8.
ITT Corporation; "Goulds Pumps Balanced Flow Submersible Pump Controller;" Jul. 2007; pp. 1-12.
ITT Corporation; "Goulds Pumps Balanced Flow Constant Pressure Controller for 3 HP Submersible Pumps;" Jun. 2005; pp. 1-4; USA.
ITT Corporation; "Goulds Pumps Balanced Flow Constant Pressure Controller for 2 HP Submersible Pumps;" Jun. 2005; pp. 1-4 USA.
Pentair; "Pentair IntelliTouch Operating Manual;" May 22, 2003; pp. 1-60.
Pentair; "Pentair RS-485 Pool Controller Adapter" Published Advertisement; Mar. 22, 2002; pp. 1-2.
Pentair Pool Products: "IntelliFlo 4X160 a Breathrough in Energy-Efficiency and Service Life;" pp. 1-4; Nov. 2005; www/pentairpool.com.
Pentair Water Pool and Spa, Inc.; "The Pool Pro's Guide to Breakthrough Efficiency, Convenience & Profitability;" pp. 1-8; Mar. 2006; wwwpentairpool.com.
"Product Focus—New AC Drive Series Targets Water, Wastewater Applications;" WaterWorld Articles; Jul. 2002; pp. 1-2.
Shabnam Mogharabi; "Better, Stronger, Faster;" Pool and Spa News; pp. 1-5; Sep. 3, 2004; www/poolspanews.com.
SJE-Rhombus; "Constant Pressure Controller for Submersible Well Pumps;" Jan. 2009; pp. 1-4; Detroit Lakes, MN USA.
SJE-Rhombus; "SubCon Variable Frequency Drive;" Dec. 2008; pp. 1-2; Detroit Lakes, MN USA.
SJE-Rhombus; "Variable Frequency Drives for Constant Pressure Control;" Aug. 2008; pp. 1-4; Detroit Lakes, MN USA.
Goulds Pumps; "Balanced Flow Submersible System Installation, Operation & Trouble-Shooting Manual;" pp. 1-9; 2000; USA.

(56) References Cited

OTHER PUBLICATIONS

Goulds Pumps; "Balanced Flow Submersible System Informational Seminar;" pp. 1-22; Undated.
Goulds Pumps; Advertisement from "Pumps & Systems Magazine;" entitled "Cost Effective Pump Protection+Energy Savings," Jan. 2002; Seneca Falls, NY.
Franklin Electric; "CP Water-Subdrive 75 Constant Pressure Controller" Product Data Sheet; May 2001; Bluffton, in USA.
Franklin Electric; "Franklin Aid, Subdrive 75: You Made It Better;" vol. 20, No. 1; pp. 1-2; Jan./Feb. 2002; www.franklin-electric.com.
F.E. Myers; "Featured Product: F.E. Myers Introducts Revolutionary Constant Pressure Water System;" pp. 1-8; Jun. 28, 2000; Ashland, OH USA.
Franklin Electric; Constant Pressure in Just the Right Size; Aug. 2006; pp. 1-4; Bluffton, IN USA.
Franklin Electric; "Franklin Application Installation Data;" vol. 21, No. 5, Sep./Oct. 2003; pp. 1-2; www.franklin-electric.com.
Franklin Electric; "Monodrive MonodriveXT Single-Phase Constant Pressure;" Sep. 2008; pp. 1-2; Bluffton, IN USA.
USPTO Patent Trial and Appeal Board, Paper 47—Final Written Decision, Case IPR2013-00285, U.S. Pat. No. 8,019,479 B2, Nov. 19, 2014, 39 pages.
Pentair Pool Products, WhisperFlo Pump Owner's Manual, Jun. 5, 2001, 10 pages.
Amended Complaint Filed by Pentair Water Pool & Spa, Inc. and Danfoss Drives A/S with respect to Civil Action No. 5:11-cv-00459, adding U.S. Pat. No. 8,043,070.
Brochure entitled "Constant Pressure Water for Private Well Systems," for Myers Pentair Pump Group, Jun. 28, 2000.
Brochure for AMTROL, Inc. entitled "AMTROL unearths the facts about variable speed pumps and constant pressure valves," Mar. 2002.
Undated Goulds Pumps "Balanced Flow Systems" Installation Record.
Texas Instruments, Digital Signal Processing Solution for AC Induction Motor, Application Note, BPRA043 (1996).
Texas Instruments, Zhenyu Yu and David Figoli, DSP Digital Control System Applications—AC Induction Motor Control Using Constant V/Hz Principle and Space Vector PWM Technique with TMS320C240, Application Report No. SPRA284A (Apr. 1998).
Texas Instruments, TMS320F/C240 DSP Controllers Reference Guide Peripheral Library and Specific Devices, Literature No. SPRU 161D (Nov. 2002).
Texas Instruments, MSP430x33x—Mixed Signal Microcontrollers, SLAS 163 (Feb. 1998).
Microchip Technology, Inc., PICMicro Mid-Range MCU Family Reference Manual (Dec. 1997).
Load Controls Incorporated, product web pages including Affidavit of Christopher Butler of Internet Archive attesting to the authenticity of the web pages, dated Apr. 17, 2013, 19 pages.
Cliff Wyatt, "Monitoring Pumps," World Pumps, vol. 2004, Issue 459, Dec. 2004, pp. 17-21.
Wen Technology, Inc., Unipower® HPL110 Digital Power Monitor Installation and Operation, copyright 1999, pp. 1-20, Raleigh, North Carolina.
Wen Technology, Inc., Unipower® HPL110, HPL420 Programming Suggestions for Centrifugal Pumps, copyright 1999, 4 pages, Raleigh, North Carolina.
Danfoss, VLT® AQUA Drive, "The ultimate solution for Water, Wastewater, & Irrigation", May 2007, pp. 1-16.
Danfoss, SALT Drive Systems, "Increase oil & gas production, Minimize energy consumption", copyright 2011, pp. 1-16.
Schlumberger Limited, Oilfield Glossary, website Search Results for "pump-off", copyright 2014, 1 page.

* cited by examiner

PUMP CONTROLLER SYSTEM AND METHOD

RELATED APPLICATIONS

This application is a divisional of co-pending U.S. patent application Ser. No. 10/730,747, filed Dec. 8, 2003, the entire contents of which are incorporated herein by reference.

FIELD OF THE INVENTION

This invention relates generally to pumps and pumping methods, and more particularly to pump motor controllers and control methods.

BACKGROUND OF THE INVENTION

Residential water systems typically include a line-operated motor for driving a pump-motor assembly to retrieve water from a well. The pump-motor assembly is generally submerged in the well at the end of a drop pipe. To maintain a constant supply pressure, the water systems also typically include a pressurized storage tank and a pressure switch that causes the motor to run when the pressure in the water system is low. The pressurized storage tanks are often relatively large, so that the motor does not need to be turned on and off frequently.

A need exists for a pump control system and method for performing a self-calibration procedure, for providing precise motor speed control, for providing a limp mode before shutting down the motor when system parameters are exceeded and/or fault conditions occur, for detecting fault conditions, and for storing fault conditions for later retrieval. Each embodiment of the present invention achieves one or more of these results.

SUMMARY OF THE INVENTION

Some embodiments of the present invention provide a method of calibrating a pump connected to a water distribution system and having a motor. The method can include operating the motor in a forward direction, sensing a pressure in the water distribution system, determining whether the sensed pressure has increased by a pressure increment, increasing an operating frequency of the motor by a frequency increment if the sensed pressure has not increased by the pressure increment, and storing a speed of the motor as a minimum calibrated speed value if the sensed pressure has increased by the pressure increment.

Other embodiments of the present invention can provide a method of regulating the speed of a motor in a pump. The method can include measuring an actual pressure in the water distribution system; determining whether the actual pressure is less than, greater than, or equal to a pre-set pressure value; subtracting the actual pressure from a desired pressure to determine a pressure error if the actual pressure is less than or greater than the pre-set pressure value; determining an integral of the pressure error; multiplying the integral by an integral gain to determine a first value; multiplying the pressure error by a proportional gain to determine a second value; summing the first value and the second value; and generating an updated speed control command based on the sum of the first value and the second value.

A limp mode can be provided according to some methods of the invention. The limp mode method can include measuring a parameter (e.g., a bus current, a bus voltage, a line current, and/or a temperature) and determining whether the parameter is greater or less than a threshold. The limp mode method can also include reducing an output voltage provided to the motor and/or an operating frequency of the motor if the parameter is greater or less than the threshold and shutting down the motor if the motor does not operate within operational limits while being driven in the limp mode.

Some embodiments of the invention can include various methods of detecting fault conditions in a motor of a pump or a water distribution system. These methods can include bus over-voltage detection, bus over-current detection, dry-running detection, over-temperature detection, high or low-speed foreign-object jamming detection, and pressure sensor failure detection. In some embodiments, the invention provides a method of creating a fault log and storing fault condition codes for later retrieval.

Further objects and advantages of the present invention, together with the organization and manner of operation thereof, will become apparent from the following detailed description of the invention when taken in conjunction with the accompanying drawings, wherein like elements have like numerals throughout the drawings.

BRIEF DESCRIPTION OF THE DRAWINGS

Some embodiments of the present invention are further described with reference to the accompanying drawings. However, it should be noted that the embodiments of the invention as disclosed in the accompanying drawings are illustrated by way of example only. The various elements and combinations of elements described below and illustrated in the drawings can be arranged and organized differently to result in embodiments which are still within the spirit and scope of the present invention.

In the drawings, wherein like reference numerals indicate like parts.

DETAILED DESCRIPTION

Figure 1:
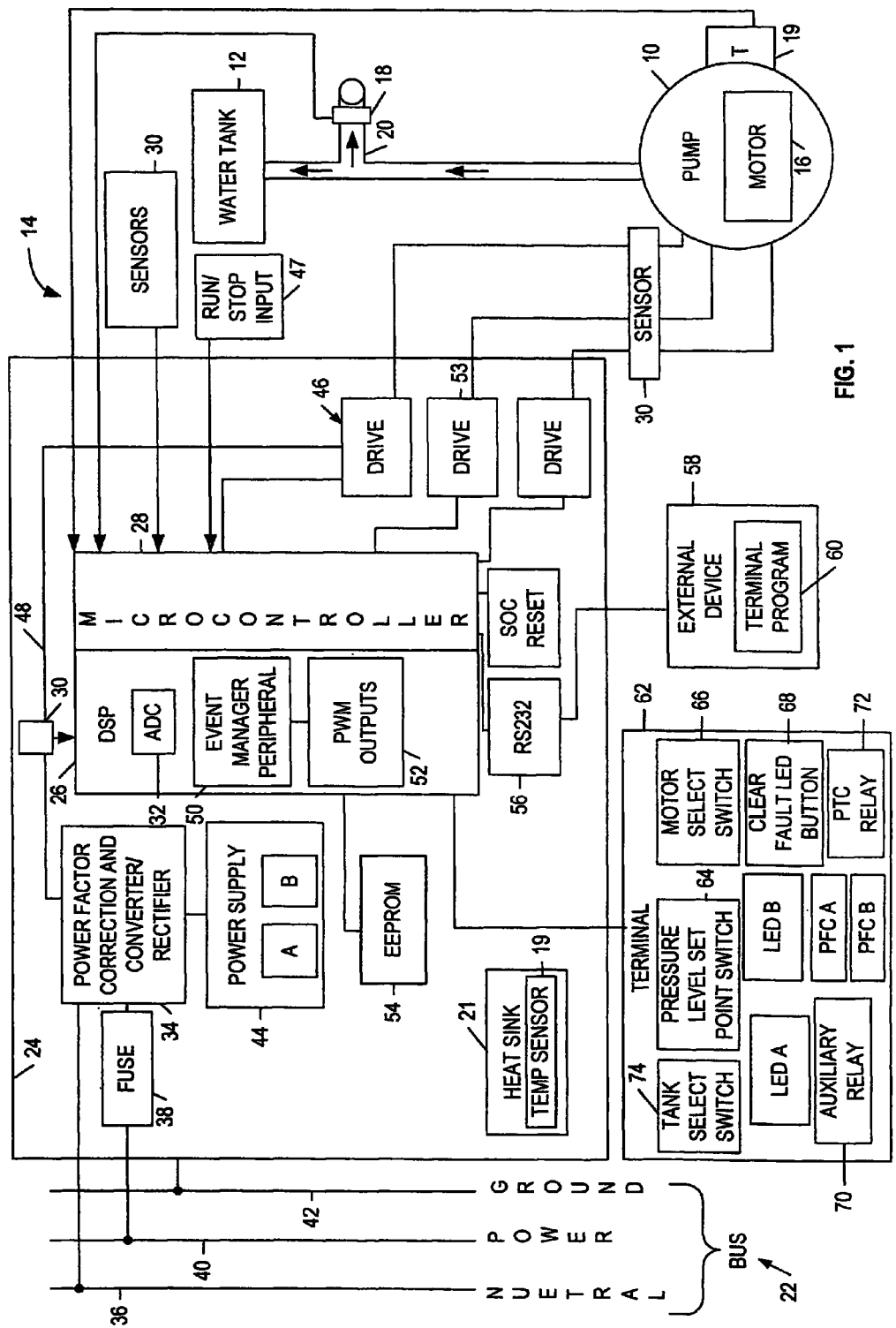
FIG. 1 is a schematic illustration of a pump, a water tank, and a pump control system according to one embodiment of the invention.

Before one embodiment of the invention is explained in full detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings and can include electrical connections and couplings, whether direct or indirect.

In addition, it should be understood that embodiments of the invention include both hardware and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software. As such, it should be noted that a plurality of hardware and software based devices, as well as a plurality of different structural components may be utilized to implement the invention. Furthermore, and as described in subsequent paragraphs, the specific mechanical configurations illustrated in the drawings are intended to exemplify embodiments of the invention and that other alternative mechanical configurations are possible.

FIG. 1 illustrates a pump 10 connected to one or more water tanks 12. In some embodiments, the pump 10 is a submersible pump for use in residential or commercial well pump systems. In other embodiments, the pump 10 is a pump for use in pool or spa systems. In still other embodiments, the pump 10 is a pump for use in residential or commercial water distribution systems that are connected to a municipal water system. If the pump 10 is for use in a pool or spa system or a distribution system that is connected to a municipal water system, the pump 10 may not be connected to a water tank. The pump 10 can be used in residential or commercial turf or irrigation systems, agricultural systems, golf course irrigation systems, drip irrigation systems, each one of which may or may not include a water tank and may or may not be connected to a municipal water system. In some embodiments, the pump 10 can be used as an additional pump in a pressure-boosting system. For example, the water distribution system can include a well, a first pump positioned in the well, a water tank connected to the first pump, and a second, booster pump connected to the water tank. In other embodiments, the pump 10 can be used in liquid distribution systems other than water distribution systems, such as systems for distributing hydraulic fluid.

The pump 10 can be connected to a pump control system 14 according to one embodiment of the invention. The pump 10 can include or can be connected to a motor 16 in any conventional manner. The pump control system 14 can be used to control the operation of the motor 16. In some embodiments, the motor 16 is an AC induction motor, a brush-less DC motor, or a switch-reluctance motor. Various outputs and/or control parameters of the pump control system 14 can be modified for each particular type of motor.

The pump control system 14 can include one or more pressure sensors. In some embodiments, a pressure sensor 18 can be positioned between the pump 10 and the water tank 12. In one embodiment, the pressure sensor 18 can be positioned to sense the pressure in an output line 20 between the pump 10 and the water tank 12. In some embodiments, the pressure sensor 18 can generate a signal having a range of about 4 to 20 mA or about 0.5 to 4.5 or 5.0 V. The signal generated by the pressure sensor can represent an actual pressure of 0 to about 50 PSI, 0 to about 100 PSI, 0 to about 250 PSI, or any other suitable pressure range. In some embodiments, the pressure sensor 18 is a 4 to 20 mA, Model No. 86HP062Y00100GSOC pressure sensor manufactured by Texas Instruments, Inc.; a 0.5 to 4.5 V, Model No. 61CP0320100SENAO pressure sensor manufactured by Texas Instruments, Inc.; a 4 to 20 mA, Model No. MSP-601-100-P-5-N-4 pressure sensor manufactured by Measurement Specialties, Inc.; or any suitable equivalent. In one embodiment, the pump control system 14 includes a single pressure sensor. However, in some embodiments, additional pressure sensors can be placed in any suitable position in a residential or commercial water distribution system, for example, between the water tank 12 and any water outlets (i.e., faucets, shower heads, toilets, washing machines, dishwashers, boilers, etc.) in order to monitor the water pressure in a residential home or a commercial building. In pool or spa systems, additional pressure sensors can be placed between the pump 10 and any input ports or output ports connected to the pool or spa. For example, pressure sensors can be positioned to sense the pressure in output ports of the pool or spa in order to detect foreign object obstructions in the output ports. A multiplexer (not shown) or a digital signal processor (as discussed below) could be used in the pump control system 14 to manage input signals from multiple pressure sensors and/or multiple input channels. One or more flow sensors can be used in the pump control system 14, rather than or in addition to the one or more pressure sensors.

The pump control system 14 can be connected to an AC bus line 22 and/or one or more batteries (not shown). The pump control system 14 can be connected to one or more batteries if the pump control system 14 is used in a portable pool or spa system, a recreational vehicle water distribution system, or a marine craft water distribution system. The batteries can be standard 12-volt automotive batteries, 24-volt batteries, or 32-volt batteries. However, the batteries can include any suitable battery size, combination of battery sizes, or battery packs. If batteries are used, the pump control system 14 can include a DC to AC inverter. In other embodiments, the pump 10 can be connected to one or more generators.

The pump control system 14 can include a controller 24. The controller 24 can include one or more integrated circuits, which can be programmed to perform various functions, as will be described in detail below. As used herein and in the appended claims, the term "controller" is not limited to just those integrated circuits referred to in the art as microcontrollers, but broadly refers to one or more microcomputers, processors, application-specific integrated circuits, or any other suitable programmable circuit or combination of circuits. The controller 24 can act as a power conditioner, a variable-speed drive, a pressure regulator, and/or a motor protector in the pump control system 14. In some embodiments, the controller 24 can include a digital signal processor (DSP) 26 and a microcontroller 28 that cooperate to control the motor 16. For example, the DSP 26 can manage overall system operations, and the microcontroller 28 can act as one or more "smart" sensors having enhanced capabilities. The microcontroller 28 can also coordinate serial communications. In some embodiments, the DSP 26 can be from the Model No. TMS320C240XA family of DSPs manufactured by Texas Instruments, Inc., or any suitable equivalent DSP. In some embodiments, the microcontroller 28 can be an 8-bit microcontroller that is on an isolated ground plane and communicates with the DSP 26 via an optically-isolated asynchronous communication channel. The microcontroller 28 can be a Model No. PIC16LF870 integrated circuit manufactured by Microchip Technology, Inc. In some embodiments, the protocol for communication between the DSP 26 and the microcontroller 28 can include 4 bytes of control data passed at a 64 Hz interval, without error detection or correction mechanisms. In some embodiments, the DSP 26 can command the microcontroller 28 to enter a "normal" mode once per second, in order to prevent the microcontroller 28 from resetting without the DSP 26 being reset. In some embodiments, the DSP 26 and/or an EEPROM 54 can be reprogrammed in the field by having new parameters, settings, and/or code uploaded, programmed, or downloaded to the DSP 26 and/or the EEPROM 54 (e.g., through the microcontroller 28 and a serial communication link 56).

The pump control system 14 can also include one or more sensors 30 and/or an array of sensors (which can include the pressure sensor 18) connected to the controller 24. In some embodiments, the DSP 26 can read one or more of the sensors 30 directly, whether analog or digital. For processing the analog sensors 30, the DSP 26 can include an analog-to-digital converter (ADC) 32. The ADC 32 can read several channels of analog signals during a conversion period. The conversion period can be set to provide an appropriate sampling rate for each sensor (e.g., a pressure sensor may be sampled at a higher rate than a temperature sensor) and/or for each particular system (e.g., a pressure sensor in a residential building may be sampled at a higher rate than a pressure sensor on an output port of a pool or spa). The ADC 32 can be reset before the DSP 26 triggers a new start of conversion (SOC). Resetting the ADC 32 can allow the DSP 26 to maintain uniform channel sample rates.

In some embodiments, the microcontroller 28 can read one or more of the sensors 30 at fixed intervals. For example, the microcontroller 28 can read the pressure sensor 18. The microcontroller 28 can also read isolated power supplies (e.g., power supply module A and power supply module B, as shown in FIG. 1) for different types of pressure sensors that can be used as the pressure sensor 18. For example, the different types of pressure sensors can include a 4-20 mA pressure sensor and a 0-5 V.sub.DC pressure sensor. In some embodiments, the microcontroller 28 can automatically determine which type of pressure sensor is connected to the system. The signal from both types of pressure sensors can be at a maximum frequency of 8 Hz, and the minimum sample rate can be 64 Hz. The sensing range for both types of pressure sensors can be 0 to about 50 PSI, 0 to about 100 PSI, 0 to about 250 PSI, 0 to about 1000 PSI, 0 to about 2500 PSI, or any other suitable pressure range for low, medium, or high-pressure applications. The microcontroller 28 can perform a pressure sensor check (for either type of pressure sensor) in order to verify that there is not a fault condition occurring with respect to the pressure sensor 18. The pressure sensor check is described in more detail below with respect to FIG. 11. The input signal from the pressure sensor check can be at a maximum frequency of 8 Hz, and the minimum sample rate can be 64 Hz.

The microcontroller 28 can also read a temperature sensor 19 (e.g., located on a heat sink 21 of the controller 24 or located in any suitable position with respect to the pump 10 and/or the motor 16). Rather than or in addition to the temperature sensor 19, the pump control system 14 can include a temperature sensor located in any suitable position with respect to the pump 10 in order to measure, either directly or indirectly, a temperature associated with or in the general proximity of the pump 10 in any suitable manner. For example, the temperature sensor can include one or more (or any suitable combination) of the following components or devices: a resistive element, a strain gauge, a temperature probe, a thermistor, a resistance temperature detector (RTD), a thermocouple, a thermometer (liquid-in-glass, filled-system, bimetallic, infrared, spot radiation), a semiconductor, an optical pyrometer (radiation thermometer), a fiber optic device, a phase change device, a thermowell, a thermal imager, a humidity sensor, or any other suitable component or device capable of providing an indication of a temperature associated with the pump 10. The input signal from the temperature sensor 19 can be at a maximum frequency of 8 Hz, and the minimum sample rate can be 64 Hz. The operating range of the temperature sensor 19 can be −25.degree. C. to +140.degree. C. The microcontroller 28 can use the input from the temperature sensor 19 to halt operation of the motor 16 during an over-temperature condition (e.g., an over-temperature condition of the controller 24), as will be described in more detail below with respect to FIG. 8. In one embodiment, if the temperature of the controller 24 becomes greater than about 70.degree. C. and/or the line voltage from the controller 24 to a two-horsepower motor 16 becomes less than about 207 V, the controller 24 can halt operation of the motor 16 or reduce the speed of the motor 16 in order to adjust for an over-temperature condition.

In addition, the microcontroller 28 can read one or more run/stop inputs 47. One or more run/stop inputs 47 can be placed in any suitable positions with respect to the water distribution system. For example, a run/stop input 47 can be a manual or automatic switch placed in close proximity to a pool or spa. If a user presses a manual switch, the controller 24 can immediately disable the motor drive. An automatic switch can be placed adjacent to a grate or a guard in a pool or spa, so that the run/stop input 47 is automatically activated (i.e., changes state) if the grate or guard is removed. Also, a run/stop input 47 can be a foreign object detection sensor placed in a pool or spa. In addition, a run/stop input 47 can be an over-pressure relief valve or a water detection sensor (e.g., placed in a basement of a residential building). The run/stop inputs 47 can be connected to the controller 24 (and in some embodiments, can be read by the microcontroller 28). The run/stop inputs 47 can be connected to one another in a daisy chain configuration, so that if any one of the run/stop inputs 47 is activated (e.g., any one of the run/stop inputs is opened in order to break the circuit), the controller 24 can immediately disable the motor drive. The run/stop inputs 47 can also be used to enable the motor drive. In some embodiments, the motor drive can be enabled when the run/stop input is active (i.e., the contacts are closed) and disabled when the run/stop input is inactive (i.e., the contacts are open).

The microcontroller 28 can send the raw data from the analog sensors to the DSP 26 at uniform time intervals via a serial port. The DSP 26 can include one or more filters (not shown) or can be programmed to filter the signals received from the sensors 30 and/or the microcontroller 28. In one embodiment, in order to facilitate filtering, the DSP 26 can read the sensors 30 or can receive signals from the microcontroller 28 at minimum sample rates of about eight times the sensed signal's maximum frequency.

As shown in FIG. 1, the pump control system 14 can include a power factor correction and converter/rectifier module 34 connected to a neutral line 36 of the AC bus line 22. The controller 24 can be connected to a ground line 42 of the AC bus line 22 in any suitable manner. The power factor correction can be greater than or equal to about 0.9, and in some embodiments greater than or equal to about 0.98, at the rated output power. The power factor correction and converter/rectifier module 34 can also be connected via a fuse 38 (e.g., an integral input fuse) to a power line 40 of the AC bus line 22. In some embodiments, the fuse 38 can be changed so that the motor 16 can be operated at two or more voltage input settings (e.g., single-phase, line-power voltage inputs of about 115 $V_{RMS}$ at about 30 $A_{RMS}$ or about 230 $V_{RMS}$ at about 15 $A_{RMS}$). In other words, a user can switch between a line-power voltage input of 115 $V_{RMS}$ and a line-power voltage input of 230 $V_{RMS}$ by changing only the fuse 38. In some embodiments, the single-phase input power is at a line voltage ranging from about 103 to 127 $V_{RMS}$, a line current of about 30 $A_{RMS}$, and a frequency ranging from about 45 to 65 Hz. In other embodiments, the single-phase input power is at a line voltage ranging from about 207 to 253 $V_{RMS}$, a line current of about 15 $A_{RMS}$, and a frequency ranging from about 45 to 65 Hz. Although the controller 24/fuse 38 combinations can be designed for particular input voltages and currents, in some embodiments, the controller 24 can operate the drives 46 to maintain a constant or near constant pressure with a voltage of up to about 255 $V_{RMS}$ with a 30 $A_{RMS}$ fuse or with a voltage of as low as about 103 $V_{RMS}$ with a 15 $A_{RMS}$ fuse.

The power factor correction and converter/rectifier module 34 can be connected to a power supply 44 (which can include a single power supply, or can include a first power supply module A and a second power supply module B, as shown in FIG. 1). The power factor correction and converter/rectifier module 34 can be connected to one or more drives 46 for the motor 16 via a DC bus line 48. The drives 46 can be connected to the pump 10 and/or the motor 16 in order to selectively control the motor 16. In some embodiments, the drives 46 can provide three-phase outputs to the motor 16. In one embodiment, the controller 24 can turn the drives 46 on and off and each of the three drives 46 can operate 120.degree. out-of-phase in order to generate an AC sine wave from the input of the DC bus line 48. In one embodiment, the three-phase outputs can include one or more of the following: 0-230 $V_{RMS}$ (line to line) at 30-200 Hz; 0-230 $V_{RMS}$ (line to line) at 30-60 Hz; and 0-230 $V_{RMS}$ (line to line) at 30-80 Hz. However, the maximum voltage output from the drives 46 can be greater than or less than 230 $V_{RMS}$. In addition, the maximum voltage output from the drives 46 can be programmed as any suitable voltage setting (e.g., for a custom motor in a voltage range of about 20 $V_{RMS}$ to about 250 $V_{RMS}$ and a frequency range of about 30 Hz to about 250 Hz). In one embodiment, the maximum output power to the motor 16 can be about 2116 $W_{MAX}$ (about 230 $V_{RMS}$ at 9.2 $A_{RMS}$ total); however, the maximum output power of the motor 16 can be greater or less than 2116 $W_{MAX}$. The maximum output voltage to the motor 16 can be about 250 $V_{RMS}$ phase-to-phase, and the maximum output current to the motor 16 can be about 5.9 $A_{RMS}$ per phase. The power efficiency can be at least about 88% at the rated output power (e.g., when the controller 24 is connected to the motor 16 with three meters of 12-3 W. G. NM-B wire). In some embodiments, the controller 24 can detect a short circuit (either line-to-line, phase-to-phase, or line-to-ground) at the output to the motor 16. The controller 24 can stop the motor drive when a short circuit is detected.

As noted, the DSP 26 can read one or more of the sensors 30 directly. One of the sensors 30 can sense the voltage of the DC bus line 48. In some embodiments, the DSP 26 can sense the voltage of the DC bus line 48 and the same sensor or another one of the sensors 30 can sense the current of the DC bus line 48. In some embodiments, the DSP 26 can determine the voltage of the AC bus line 22 from the voltage on the DC bus line 48, and the DSP 26 can determine the current of the AC bus line 22 from the current on the DC bus line 48 (e.g., by applying one or more conversion factors to the voltage and current of the DC bus line 48). In some embodiments, one to four sensors can be included on the DC bus line 48 in order to measure AC line current, AC line voltage, DC bus current, and DC bus voltage. The one or more sensors 30 on the DC bus line 48 can be read by the DSP 26 and/or the microcontroller 28.

In general, the terms "bus line," "bus voltage," and "bus current" as used herein and in the appended claims refer to the DC bus line 48 itself or the voltage and current, respectively, of the DC bus line 48. The bus voltage of the DC bus line 48 can be monitored to determine the power being supplied to the drives 46. In some embodiments, the target voltage for the DC bus line 48 is about 380 $V_{DC}$. The voltage of the DC bus line 48 can be used by the DSP 26 to halt operation of the motor 16 during an over-voltage or under-voltage condition, as will be described in detail below with respect to FIG. 5. Also, if the voltage of the DC bus line 48 is low, the DSP 26 can operate the motor 16 in a limp mode, as will also be described in detail below with respect to FIG. 4. The bus current can also be monitored to determine the power being supplied to the drives 46. In addition, the bus current can be monitored in order to operate the motor 16 in a limp mode (as described in more detail below with respect to FIG. 4) if the bus current exceeds a programmed threshold. In some embodiments, the maximum frequency of the sensor or sensors 30 for the DC bus line 48 is about 280 Hz, and the minimum sample rate is about 2,240 Hz.

The terms "line voltage" and "line current" as used herein and in the appended claims generally refer to the voltage and current, respectively, of the AC bus line 22 (although the voltage and current of the AC bus line 22 may be converted from a measurement taken from the DC bus line 48). However, it should be understood by one of ordinary skill in the art that a bus voltage can be a line voltage (both voltages are measured from an electrical "line"), and vice versa. It should also be understood by one of ordinary skill in the art that a bus current can be a line current (both currents are measured from an electrical "line"), and vice versa. Thus, the term "bus voltage" can include a "line voltage" and the term "bus current" can include a "line current." In some embodiments, the single-phase input power of the AC line voltage is about 115 to 230 $V_{RMS}$ at a frequency of about 45 to 65 Hz. In some embodiments, the single-phase input power is at an AC line voltage of about 103 to 127 $V_{RMS}$, an AC line current of about 30 $A_{RMS}$, and a frequency of about 45 to 65 Hz. In other embodiments, the single-phase input power is at an AC line voltage of about 207 to 253 $V_{RMS}$, an AC line current of about 15 $A_{RMS}$, and a frequency of about 45 to 65 Hz. In one embodiment, the maximum frequency of the AC line voltage and current signals is about 65 Hz, and the minimum sample rate is about 520 Hz.

One of the sensors 30 (which can be read by the DSP 26, in some embodiments) can sense a reference voltage that can be used to calculate an offset value for the analog inputs managed by the DSP 26. The reference voltage is generally one-half of the DC rail voltage for the active filters that process the signal. However, due to tolerances, temperature, and age, the reference voltage can vary slightly over time. Accordingly, the reference voltage can be measured by one of the sensors 30 in order to account for any variances. In some embodiments, the maximum frequency of the reference voltage input can be about 8 Hz, and the minimum sample rate can be about 64 Hz. In some embodiments, the reference voltage can be measured from any suitable point inside of the controller 24.

As shown in FIG. 1, the DSP 26 can include an event manager peripheral module 50 and a pulse-width modulation (PWM) output module 52. In some embodiments, the PWM output module 52 can include six PWM output channels in order to control one or more inverter drives 53 that can supply three-phase power to the motor 16. The PWM output module 52 can use a switching frequency of about 7.2 kHz plus or minus 1%. The PWM output waveforms can be symmetric and can be operated in a manner consistent with space vector pulse-width modulation (SVPWM) firing sequences, as will be described in more detail below. The event manager peripheral module 50 in the DSP 26 can control the PWM output waveforms, as well as their dead band timers.

The controller 24 can include one or more types of memory, for example, program memory (FLASH), primary data memory, and secondary non-volatile data memory (e.g., a serial EEPROM 54). The EEPROM 54 can be connected to the DSP 26. The controller 24 can also include a serial communication link 56 (e.g., an optically-isolated RS-232 link using a standard DB-9 connector). In some embodiments, the serial communication link 56 can be permanently or removably connected to an external device 58, such as a personal computer, a laptop, or a personal digital assistant (PDA) running a terminal program 60 (e.g., Windows™ HyperTerminal). In one embodiment, the parameters for serial communication can include 9600 baud, 8 data bits, no parity, 1 stop bit, and XON/XOFF flow control. In some embodiments, the data from the terminal program 60 can be transferred to the DSP 26 from the microcontroller 28. The data from the terminal program 60 can be limited to ASCII printable standard characters and can be interleaved with control data packets. The most significant bit of the data byte being sent can be used by the DSP 26 to identify the control data packets.

In some embodiments, a user can access the controller 24 with the external device 58 in order to configure drive parameters, to manually run or stop the drives 46 to the motor 16, or to read one or more of the following parameters: run/stop input status, current actual pressure, motor speed, bus voltage, bus current, total operating hours, powered time, running time, controller parameters, fault condition codes, fault history, software version, various parameter lists (e.g., control or operational parameters), current drive frequency, input line voltage, input line current, input power, output power to motor, constant pressure setpoint, heat sink temperature, auxiliary output relay status, motor select switch setting, pressure level setpoint switch setting, low band pressure, high band pressure, dry running status, proportional gain, integral gain, calibrated minimum speed value, V/Hz curve settings, limp mode thresholds, or any other desired information. Each of these parameters can be stored in the EEPROM 54. Many of these parameters will be discussed in more detail below with respect to FIGS. 2-13. A user can also enter one or more of the following commands via the external device 58 and the serial communication link 56: run pressure calibration (in order to manually run a self-calibration procedure), software reset, and default EEPROM (in order to set the parameters stored in the EEPROM back to their default settings).

In some embodiments, the serial communication link 56 can be used to link any number of controllers 24 located throughout the world via a network (e.g., the Internet) to one another and/or to a monitoring system or station. For example, each controller 24 can be removable or permanently connected to a computer or any other suitable device configured to communicate over the network with the monitoring system or station. Each controller 24 can have an Internet-protocol address and/or can be equipped with additional peripheral equipment for network communications. The monitoring system or station can be used to monitor the operation of the controllers 24, pumps 10, and/or motors 16; to troubleshoot the controllers 24, pumps 10 and/or motors 16; and/or to change the operating parameters of the controllers 24.

As also shown in FIG. 1, the pump control system 14 can include a terminal 62. The terminal 62 can be connected to the controller 24. In some embodiments, the terminal 62 and the controller 24 can be included in a single housing and mounted in any suitable position in the water distribution system for access by a user. The housing can be a rain-proof/weather-resistant enclosure and can be constructed of NEMA-4 material. The terminal 62 can be directly or indirectly connected to the DSP 26.

The terminal 62 can include a pressure level setpoint switch 64, which can be used to set a constant pressure setpoint for the water distribution system. In one embodiment, a default constant pressure setpoint (e.g., about 60 PSI) can be stored in the EEPROM 54. In one embodiment, the pressure level setpoint switch 64 can have 16 positions and the pressure settings can range from about 25 PSI to about 95 PSI in 5-PSI increments. In some embodiments, if the pressure level setpoint switch 64 is in a certain position (such as the zero position), the constant pressure setpoint can be loaded from the external device 58 over the serial communication link 56 and can be stored in the EEPROM 54. The constant pressure setpoint can then be recovered from the EEPROM 54 when power is provided to the pump control system 14. In some embodiments, a user can set the constant pressure setpoint via the external device 58 and the serial communication link 56 according to any suitable increments (e.g., 1 PSI increments, 0.5 PSI increments, 0.01 PSI increments, etc.).

The controller 24 (e.g., using the PWM output module 52 of the DSP 26 and the drives 46) can drive a three-phase induction motor using a space vector pulse-width modulation (SVPWM) technique. Using the SVPWM technique, a commanded drive frequency can be converted to an angular value via numerical integration. The SVPWM output can provide precise control of the magnitude and angle for the stator electromagnetic field of the AC induction motor. The angular value can be determined by integrating the commanded drive frequency. The angular value can be combined with the desired output voltage level (which is a function of the speed of the motor 16) in order to provide the pulse timings for the three-phase power converter.

Figure 13:
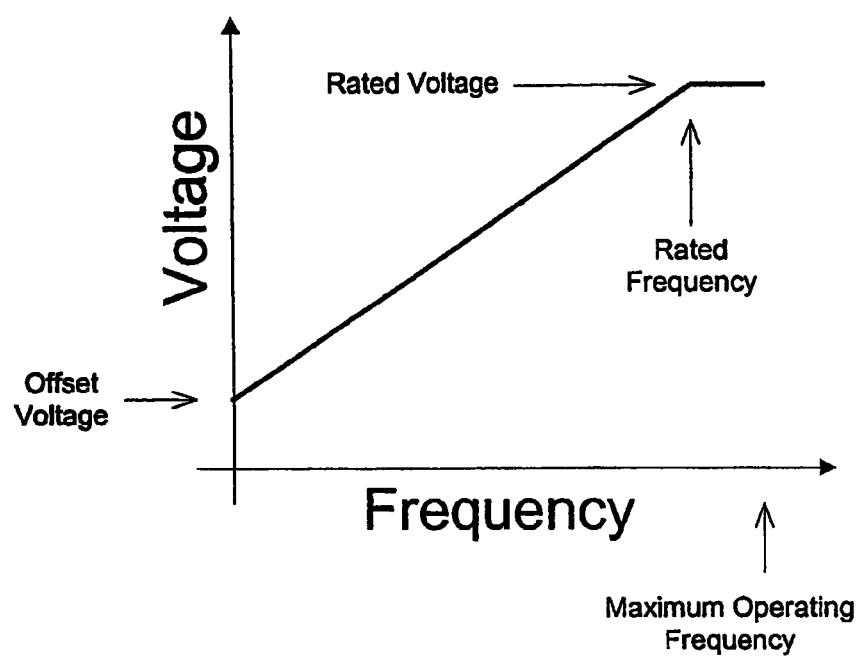
FIG. 13 is an example of a Voltage/Hertz (V/Hz) curve for a motor for use with one embodiment of the invention.

The desired output voltage level can be calculated using a Volts-Hertz (V/Hz) curve, which can provide the output voltage level based on the drive frequency. FIG. 13 illustrates an example of a V/Hz curve, including the following four parameters: offset voltage, rated voltage, maximum operating frequency, and rated frequency. The shape of the V/Hz curve depends on the type of motor and can generally be determined from the motor speed and the voltage ratings. The rated voltage and the rated frequency are often displayed on the motor itself. In one embodiment, default settings of about 250

V.sub.RMS for the rated voltage and about 65 Hz for the rated frequency can be stored in the EEPROM 54. Most motor manufacturers supply the offset voltage with the V/Hz curve. However, in one embodiment, default setting of about 10 V.sub.RMS for the offset voltage can be stored in the EEPROM 54. The offset voltage is necessary to produce the rated flux (and thus the rated torque) and is dependent on the stator winding resistance and the rated magnetized current of the motor 16. At motor speeds greater than the rated frequency, the output voltage will generally remain at the rated voltage and the torque will decrease (due to field weakening). In some embodiments, the maximum operating frequency is only set to a value higher than the rated frequency if the motor is not fully loaded at the rated frequency (i.e., the motor does not use the entire rated torque). In one embodiment, a default setting of about 80 Hz for the maximum operating frequency can be stored in the EEPROM 54.

In some embodiments, the V/Hz curves can be implemented via a first order curve with an upper limit and an offset term. In other embodiments, a second order curve can be implemented to further optimize system performance. For each V/Hz curve, several parameters can be stored in the EEPROM 54 of the pump control system 14. The stored parameters can include slope, rated (maximum) voltage, offset voltage, maximum operating frequency, and minimum operating frequency. The slope value can be calculated based on the offset voltage, the rated voltage, and the rated frequency.

As shown in FIG. 1, the terminal 62 can include a motor select switch 66, which can be used in some embodiments to configure the drives 46 for the particular motor 16, for example, by selecting an appropriate V/Hz curve. In one embodiment, the motor select switch 66 can be an 8-position rotary switch with three digital output lines. In some embodiments, the motor select switch 66 can be used to select three sets of factory defaults for three specific types of motors. A user can position the motor select switch 66 in order to select the V/Hz curve, a voltage limit, a current limit, and a power limit (i.e., motor protection limits) for a particular type of motor. In one embodiment, a user can select one of the following types of motors using the motor select switch 66: a 30 to 60 Hz motor; a 30 to 80 Hz motor; and a 30 to 200 Hz motor. For a 30 to 60 Hz motor, the maximum voltage, the rated frequency, and the maximum frequency can each occur at about 60 Hz. For a 30 to 80 Hz motor, the rated frequency can occur at about 65 Hz and the maximum frequency can occur at about 80 Hz. Between 65 Hz and 80 Hz, the output voltage can be held constant at the maximum value. For a 30 to 200 Hz motor, the maximum voltage, the rated frequency, and the maximum frequency can each occur at about 200 Hz.

The motor select switch 66 can also be used to select a custom motor, which can be manually configured by the user via the serial communication link 56. In some embodiments, a user can set a V/Hz curve, a voltage limit, a current limit, a power limit, a shutdown bus current, a limp mode bus current, and dry-running current setpoints for a custom motor. In one embodiment, for the V/Hz curve of a custom motor, a user can specify each of the parameters shown in FIG. 13 via the serial communication link 56 (i.e., offset voltage, rated frequency, rated voltage, and maximum operating frequency). In one embodiment, the motor select switch 66 must be in a zero position in order for the user to be allowed to change various settings via the serial communication link 56. In some embodiments, if a user makes changes to the V/Hz curves via the serial communication link 56, the changes will not take effect until the pump control system 14 is reset.

As shown in FIG. 1, the terminal 62 can also include a tank select switch 74 for providing a tank parameter input (such as tank size) to the controller 24 and/or the EEPROM 54. The controller 24 can use the tank parameter input from the tank select switch 74 to select different gains (e.g., a proportional gain, an integral gain, etc.) for use in controlling the pump 10 and/or the motor 16.

As shown in FIG. 1, the terminal 62 can include one or more status indicator light-emitting diodes (LEDs) (e.g., LED A and LED B). The status indicator LEDs can be lit continuously or can flash at various rates (e.g., slow, fast, or combination rates) to indicate the status of the drive 46 of the motor 16. In one embodiment, LED A (e.g., a green LED) can be lit continuously when power is being applied, but the controller 24 is not driving the motor 16. LED A can flash slowly when the controller 24 is driving the motor 16 and the controller 24 is not operating in a limp mode (as will be described in detail below with respect to FIG. 4). LED A can flash quickly if the controller 24 is driving the motor 16 in a limp mode. LED A can also flash at a 50% duty cycle during a 30-second power-up delay.

In one embodiment, LED B (e.g., a red LED) can be used to indicate various fault conditions to a user. Each of the various fault conditions will be described in detail below with respect to FIGS. 5-11. In one embodiment, when no fault conditions have occurred since the last reset (or since the fault conditions were last cleared), LED B is not lit. If a fault condition occurs, LED B can flash at a certain rate based on the type of fault condition. LED B can continue to flash at the particular rate until a different fault condition occurs or until a user presses a clear fault LED button 68 on the terminal 62. The clear fault LED button 68 can be a normally-open pushbutton contact that can halt the flashing of LED B when the push-button contact is closed. In one embodiment, the fault conditions and/or the fault log are not cleared when a user presses the clear fault LED button 68. LED B can be continuously lit if a certain number of fault conditions (such as 15 fault conditions) has occurred within a certain time period (such as 30 minutes). In some embodiments, the flash rate of LED B only indicates a general class of the fault conditions. However, in other embodiments, the flash rate of LED B can indicate specific individual fault conditions. In one embodiment, LED B is lit when a fault condition is occurring, but the controller 24 shuts off LED B if the fault condition is no longer occurring. In other words, LED B does not remain lit continuously once the fault condition is no longer occurring, even if the pump control system 14 does not include a clear fault LED button 68 or a user has not pushed the clear fault LED button 68.

The terminal 62 can include an auxiliary relay 70, as shown in FIG. 1, having a programmable output. The auxiliary relay 70 can be used to control any external devices and/or circuits. In some embodiments, if enabled, the auxiliary relay 70 can report the state of the motor 16 and can be closed whenever the controller 24 is driving the motor 16. If not enabled, the output of the auxiliary relay 70 can be off. A user can enable or disable the auxiliary relay 70 via the serial communication link 56 and the external device 58. A user can program a minimum time period (e.g., 500 ms) during which the auxiliary relay 70 is energized before being de-energized. A user can also program a minimum time period (e.g., 500 ms) that the auxiliary relay 70 must be de-energized before being re-energized. In addition, a user can program a minimum time period (e.g., 500 ms) that the motor 16 must be off before the auxiliary relay 70 is allowed to de-energize. In general, the auxiliary relay 70 can be programmed to provide any suitable output signal based on any condition or parameter (e.g., pressures, currents, voltages, limp mode status) that can be determined or monitored by the controller 24. For example, the auxiliary relay 70 can be connected to a second, booster pump or a pump that provides doses of chemicals to a pool or spa system. The auxiliary relay 70 can be programmed to provide any suitable output for controlling the second, booster pump (such as operating the booster pump when the actual pressure in the water distribution system falls below a certain threshold). The auxiliary relay 70 can be programmed to provide any suitable output for controlling the doses of chemicals to the pool or spa system (such as providing a chemical dose after a certain number of hours of operation).

The terminal 62 can include one or more power factor correction (PFC) controls (e.g., PFC A and PFC B, as shown in FIG. 1). PFC A can be used to select a target DC bus voltage (e.g., 350 V.sub.DC or 380 V.sub.DC). PFC B can be used to enable or disable the hardware-based PFC module 34 in the controller 24. The terminal 62 can also include a PTC relay 72 that can be used to enable or disable a PTC pre-charge circuit for the DC bus line. The PFC module 34 can be enabled when the PTC pre-charge circuit is switched out and the bus is considered started.

The controller 24 can be programmed to operate the pump control system 14 in order to perform several functions and/or methods according to several embodiments of the invention, as shown and described below with respect to FIGS. 2-12. In some embodiments, the DSP 26 of the controller 24 is programmed to perform each of the functions and/or methods shown and described with respect to FIGS. 2-12.

Figure 2:
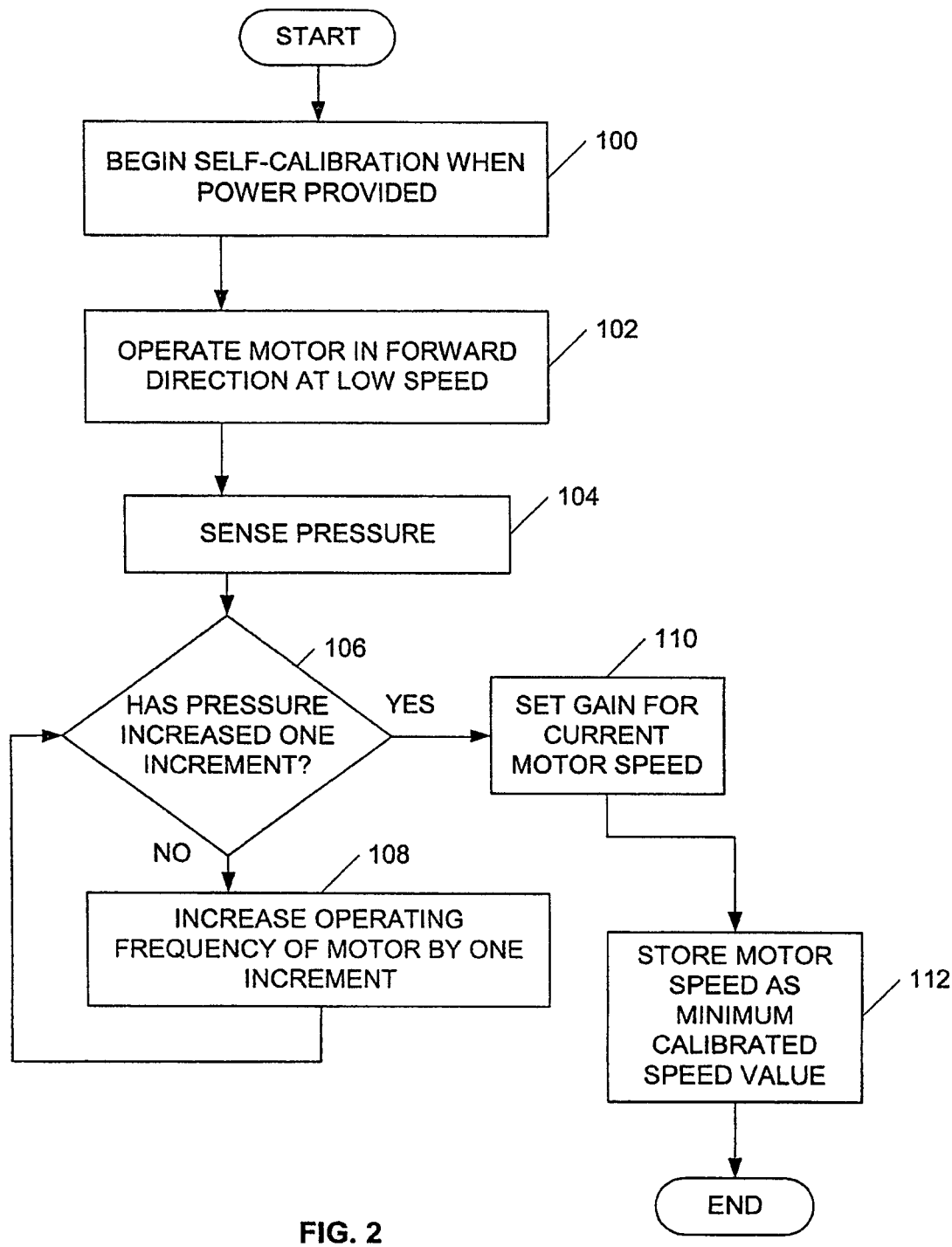
FIG. 2 is a flowchart illustrating a pump calibration method of operation for use with the pump control system of FIG. 1.

Referring first to FIG. 2, the controller 24 can perform a self-calibration procedure when the pump 10 is initially installed (e.g., when a submersible pump is lowered into the ground, when a pool or spa pump is installed, when a pump is connected to a water distribution system, etc.). A user can perform a number of tasks during the installation of the pump 10. For example, those tasks can include the following: configuring any rotary switch settings, connecting a pressure feedback, connecting run/stop input terminals to external switches and/or devices (e.g., a device can provide an output to energize a relay or a circuit can be electronically opened or closed), connecting the motor leads, connecting the motor chassis to earth ground, and connecting the line power (single-phase 115 V.sub.RMS or 230 V.sub.RMS). Once one or more of these tasks are completed and power is initially provided to the pump 10 and/or the motor 16, the controller 24 can begin (at 100) the self-calibration procedure. Power can be provided when a user connects the AC bus line 22 to the controller 24, which provides power to the power factor correction and converter/rectifier module 34, to the DC bus line 48, to the drives 46, and to the pump 10 and/or the motor 16.

In some embodiments, all user valves or outputs in the water distribution system are shut and the pressure in the water tank 12 is below the constant pressure setpoint before the controller 24 begins the self-calibration procedure. If the pressure in the water tank 12 is greater than the constant pressure setpoint, the controller 24 can delay the self-calibration procedure until the pressure in the water tank 12 falls below the constant pressure setpoint. In some embodiments, the controller 24 can wait for another time period (such as five seconds) after the pressure in the water tank 12 falls below the constant pressure setpoint, during which time period flow in the water distribution system can be shut off (in order to prevent inaccurate calibration results).

The self-calibration procedure, in some embodiments, can include a regulation mode during which the controller 24 operates the pump 10 to raise the pressure in the water tank 12 to a desired tank pressure setpoint. Once the pressure in the water tank 12 has been raised to the desired tank pressure setpoint or if the pressure in the water tank 12 was already at the desired tank pressure setpoint when the regulation mode began, the self-calibration procedure can continue to a search mode. In the search mode, the controller 24 can determine a search pressure by adding a pressure value (e.g., 1 PSI) to the current pressure in the water tank 12.

Referring to FIG. 2, in the search mode, the controller 24 can begin operating (at 102) the motor 16 in a forward direction (i.e., the direction that supplies water to the water tank 12 and/or to the water distribution system) at a relatively low speed (e.g., a minimum operating speed of 30 Hz). The controller 24 can sense (at 104) a pressure in the water distribution system. In one embodiment, the controller can read the pressure sensor 18 positioned in an outlet port 20 between the pump 10 and the water tank 12. The controller 24 can determine (at 106) whether the pressure has increased by a pressure increment, such as 1 PSI or any other suitable pressure increment. If the sensed pressure has not increased by the pressure increment, the controller 24 can increase (at 108) an operating frequency of the motor by a frequency increment, such as 1 Hz. In other words, the controller 24 can begin operating the motor 16 at the motor's minimum operating speed and slowly increase the motor speed until the pressure in the water tank 12 exceeds the search pressure. In some embodiments, the controller 24 can increase the motor speed, pause for a time period to allow the water distribution system to stabilize (e.g., for 10 seconds), and then resume increasing the motor speed. The controller 24 can pause the increasing of the motor speed to allow the water distribution system to stabilize any suitable number of times during the self-calibration procedure.

If the sensed pressure has increased by the pressure increment, the controller 24 can set (at 110) one or more gain values (e.g., a proportional gain, an integral gain, or any other system gain) based on the current speed of the motor 16. In some embodiments, the controller 24 can access a look-up table in order to find the appropriate gain values for the current speed of the motor 16. The controller 24 can then store (at 112) the speed of the motor 16 as the minimum calibrated speed value or the minimum non-zero flow speed. In some embodiments, the controller 24 can decrease or increase the current speed of the motor 16 by one or more frequency increments (or by any other suitable increment or value) and store the decreased or increased speed value as the minimum non-zero flow speed. For example, the controller 24 can access a look-up table to find an appropriate minimum non-zero flow speed for the current motor speed. The minimum non-zero flow speed can be stored in any suitable system memory, such as the EEPROM 54. The search mode can end when the motor 16 is spinning at or above the minimum non-zero flow speed, which causes flow into the water tank 12 and raises the pressure in the water tank 12. The minimum non-zero flow speed can be a function of the pump 10, the motor 16, a total head pressure at the pump 10 (which can be a function of a pressure setpoint for the water tank 12 and a depth of a well, if the pump 10 is being installed in a well), and any other sizes, features, or requirements of the water distribution system within which the pump 10 is installed. It should also be noted that even after the self-calibration procedure is used to set the minimum non-zero flow speed, a user can change the minimum non-zero flow speed via the external device 58 and the serial communication link 56.

In addition to the self-calibration procedure described above, in some embodiments, the controller 24 can compute an idle speed for the water distribution system. The controller 24 can also set gains for an actual pressure regulation proportional/integral control loop. The gains can be based on the minimum non-zero flow speed, and can be determined, for example, by accessing a look-up table of empirical values. In addition, the controller 24 can initialize various portions of the pump control system 14 by setting registers, inputs/outputs, and/or variables.

After the self-calibration procedure is complete, the controller 24 can use the minimum non-zero flow speed as the initial speed for the motor 16 whenever the motor 16 is initially turned on. In other words, when a pressure in the water distribution system drops below a certain level (as will be described in detail below with respect to FIG. 3), the controller 24 can use the minimum non-zero flow speed as the initial speed for the motor 16, rather than using an initial speed close to zero and ramping the speed up to a more effective speed for the particular water distribution system. Accordingly, the minimum non-zero flow speed can be generated by the controller 24 for each particular water distribution system.

In addition to performing a self-calibration procedure when the pump 10 is installed, the controller 24 can perform a self-calibration procedure whenever power and a new constant pressure setpoint are provided to the pump control system 14. When power is provided to the drive 46 for the motor 16, the pump control system 14 determines if the current constant pressure setpoint is the same as the previous constant pressure setpoint. The previous constant pressure setpoint can be stored in memory, such as the EEPROM 54. In some embodiments, a user can provide a new constant pressure setpoint for the water distribution system by using the external device 58 connected to the controller 24 via the serial communication link 56. In other embodiments, the controller 24 can automatically perform a self-calibration procedure whenever the drive 46 is provided with power and a new input from the pressure setpoint switch 64 and/or the motor select switch 66. For example, a 30 second delay period during the power-up process can be used by the controller 24 to check the switches 64 and/or the switch 66 to determine if the settings have been changed. If the settings have been changed, the controller 24 can automatically perform a self-calibration procedure. Also, if the motor select switch 66 is set for custom parameters (e.g., as input by the user via the serial communication link 56), the user can manually request the self-calibration procedure after updating the custom parameters. In some embodiments, a user can manually or automatically request an additional self-calibration procedure (e.g., via the serial communication link 56). If the user requests an additional self-calibration procedure, the controller 24 can stop operating, but it may not be necessary for the controller 24 to power-down before performing the self-calibration procedure.

In some embodiments, when the motor 16 is started from a stopped state, the controller 24 can use a "soft start" algorithm. In one embodiment, the soft start algorithm can be an acceleration of the motor 16 from 0 to about 30 Hz in about 1 second. The soft start algorithm can also be defined by a self-lubrication specification for the pump 10 and/or the motor 16.

In some embodiments, when the motor 16 is commanded to stop while in a running state, the controller 24 can use a "soft stop" algorithm. The controller 24 can use a soft stop algorithm when the commanded drive frequency is below about 30 Hz. The voltage provided to the motor 16 can be ramped down to zero volts as quickly as possible without causing motor regeneration. The controller 24 can also use a soft stop algorithm to prevent rapid cycling when the water demand is slightly less than the minimum flow rate of the pump 10 for a particular water tank 12 and well depth. In this case, a soft stop algorithm can allow the motor 16 to idle at a minimum operating speed for about 10 seconds after the target pressure is reached and the water demand has stopped. This type of soft stop algorithm can mitigate constant on/off cycling of the pump 10 during times of low water demand (e.g., when a leak has occurred).

Figure 3:
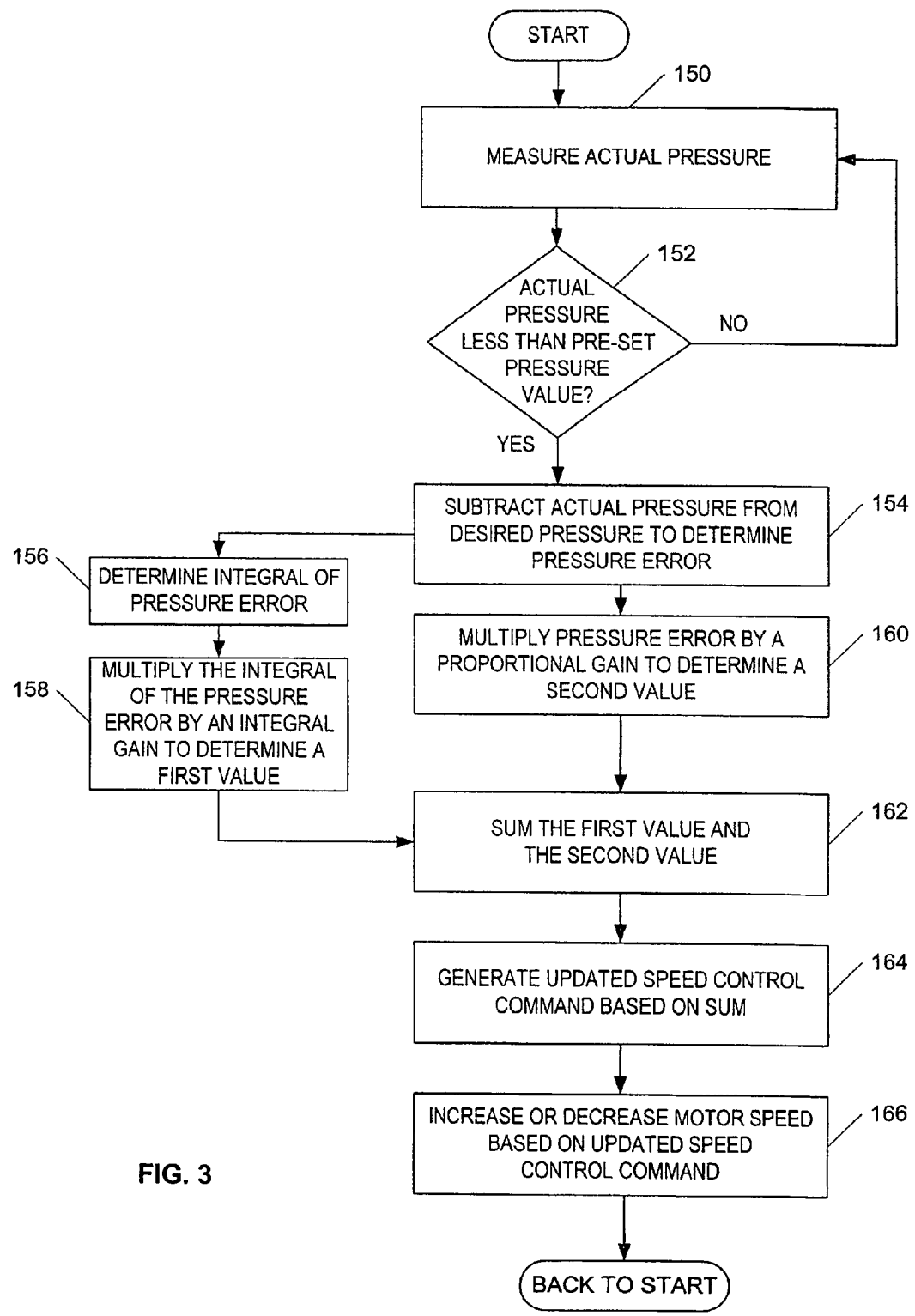
FIG. 3 is a flowchart illustrating a speed regulation method of operation for use with the pump control system of FIG. 1.

Referring to FIG. 3, the controller 24 can regulate the speed of the motor 16 in order to maintain a constant or near constant water pressure in the water distribution system. The controller 24 can use a proportional/integral (PI) control loop to generate an updated speed control command (i.e., a PI control output). The controller 24 can measure (at 150) an actual pressure in the water distribution system. Generally, the pump control system 14 remains idle until the pressure in the water distribution system drops below a pre-set pressure value (which can also be referred to as the constant pressure setpoint). More specifically, the controller 24 can determine (at 152) whether the actual pressure is less than a pre-set pressure value. If the actual pressure is less than the pre-set pressure value, the controller 24 can subtract (at 154) the actual pressure from a desired pressure to determine a pressure error. The controller 24 can determine (at 156) an integral of the pressure error and can multiply (at 158) the integral by an integral gain (e.g., a gain of 18) to determine a first value (e.g., the integral component of the PI control output). The controller 24 can multiply (at 160) the pressure error by a proportional gain (e.g., a gain of 80) to determine a second value (e.g., the proportional component of the PI control output). The controller 24 can sum (at 162) the first value and the second value and can generate (at 164) an updated speed control command based on the sum of the first value and the second value (e.g., the sum of the proportional and integral components of the PI control output). In some embodiments, the speed control command can represent a motor drive frequency. Based on the updated speed control command, the controller 24 can increase or decrease (at 166) the speed of the motor 16 to maintain a constant or near constant pressure setpoint. In this manner, the controller 24 can regulate the speed of the motor 16 in real-time or near real-time.

In some embodiments, the pump control system 14 can provide integral control in order to provide a zero steady-state error. In other words, if the motor 16 is spinning and the pump 10 is providing flow, the actual pressure can be equal to the constant pressure setpoint and the motor 16 can continue to operate. However, if the pump control system 14 provides only proportional control, the actual pressure will be slightly lower than the constant pressure setpoint. This slightly low pressure occurs because proportional control is error driven (i.e., there must be some error to generate a non-zero proportional output). Thus, if the pump 10 and the motor 16 are spinning and supplying water flow as the actual pressure is equal to or approaching the constant pressure setpoint, the proportional output is zero and the controller 24 does not increase the speed of the motor to meet or exceed the constant pressure setpoint. As a result, the actual pressure is slightly lower than the constant pressure setpoint if the pump control system 14 provides only proportional control.

When the pressure in the water distribution system exceeds the constant pressure setpoint, the controller 24 can stop driving the motor 16 after a predetermined increase (e.g., 1 PSI) in pressure above the pre-set pressure value (which can also be referred to as the constant pressure setpoint). In some embodiments, there is a hysteresis band above and below the constant pressure setpoint. For example, a high band pressure value can be 4 PSI greater than the constant pressure setpoint and a low band pressure value can be 1 PSI less than the constant pressure setpoint. However, in some embodiments, a user can configure the high and low band pressure values, and the user can store the high and low band pressure values in memory (such as an EEPROM).

In some embodiments, the actual pressure in the water distribution system is monitored constantly or almost constantly, but no action is taken until the actual pressure falls below the low band pressure. Once the motor 16 starts spinning, normal operation with the PI control loop (as described above with respect to FIG. 3) can commence and can continue until the actual pressure exceeds the high band pressure or until the PI control output is zero. With the motor 16 spinning, the controller 24 can continuously or semi-continuously regulate (e.g., regulate at a suitable sample rate) the motor speed using the PI control loop, as long as the actual pressure remains below the high band pressure value. The drives 46 to the motor 16 can be set to zero when the actual pressure exceeds the high band pressure value. During normal operation, the actual pressure can remain constant or near constant at a value close to the constant pressure setpoint, as long as water usage does not exceed the capabilities of the pump 10 and/or the motor 16. However, large instantaneous changes in flow requirements may result in variations from the constant pressure setpoint and/or the high and low band pressure values.

The controller 24 can perform low-pressure undershoot and low-pressure recovery time procedures during instances of increased flow. For example, the controller 24 can set appropriate gains in order to recover from a large flow demand after which the motor 16 cannot instantaneously speed up enough. The controller 24 can also perform a high-pressure overshoot procedure during instances of decreased flow (including zero flow). For example, the controller 24 can set appropriate gains in order to recover when a valve is closed so quickly that flow cannot be stopped quickly enough.

As discussed above, in order to provide high performance control, the controller 24 can take into account the motor speed required for the pump 10 to open any check valves and produce a positive water flow in the water distribution system. This motor speed can be determined during the self-calibration procedure described above with respect to FIG. 2 (or during an automatic or manual calibration procedure conducted subsequent to the initial installation of the pump 10) and can be referred to as the minimum calibrated speed value or the minimum non-zero flow speed. In some embodiments and/or particular situations, the controller 24 can provide an actual motor command to the motor 16 equal to the sum of the speed control command (i.e., the PI control output as described above with respect to FIG. 3) and the minimum non-zero flow speed. As a result, small pressure errors are capable of turning the motor 16 on, which allows more accurate pressure regulation during low-flow states, as well as rapid responses for large transient increases in flow demand.

In some embodiments, the controller 24 can provide a pump motor frequency of zero in certain situations. For example, as described above, if the actual pressure exceeds the high band pressure value, the drive to the motor 16 can be ramped down to a zero frequency. As another example, when the actual pressure has reached the constant pressure setpoint and no flow is occurring, the PI control output may fall below a low threshold. When the PI control output falls below the low threshold, the controller 24 can set the motor output at an idle speed for an idle time period, such as ten seconds. The idle speed can be a speed below the minimum non-zero flow speed that can keep the motor spinning without opening any check valves or causing water to flow from the pump 10. During the idle time period, if a drop in pressure occurs (i.e., a demand for flow occurs), the controller 24 can automatically switch from the idle mode to the normal pressure regulation mode as described with respect to FIG. 3. During these transitions, the motor 16 is already running at a speed near the minimum non-zero flow speed, which allows a quicker flow response than starting the motor 16 from a zero speed. However, if the idle time period has elapsed without a drop in pressure (i.e., without a demand for flow), the drive to the motor 16 can be ramped down to a zero frequency.

Figure 4:
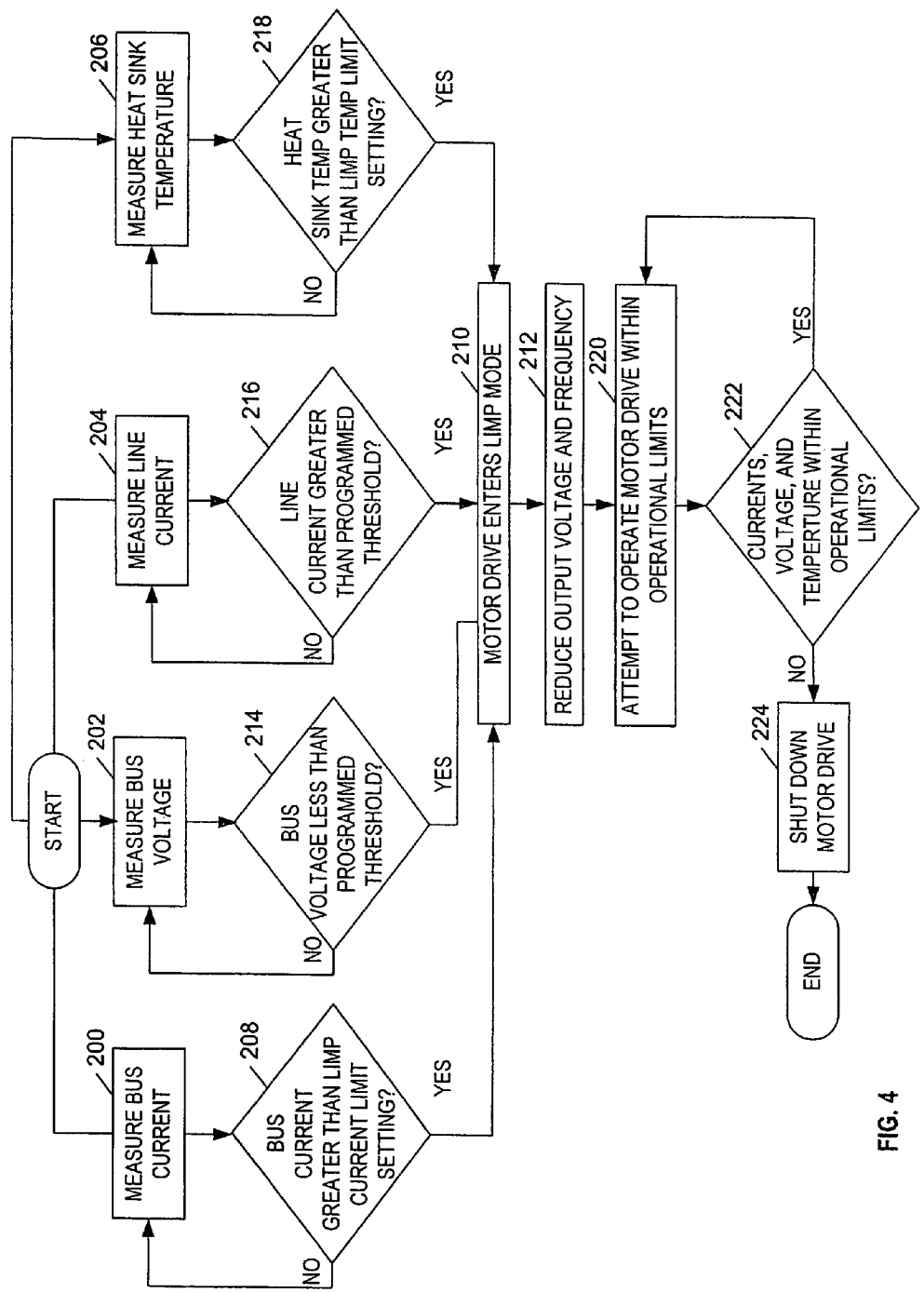
FIG. 4 is a flowchart illustrating a limp mode method of operation for use with the pump control system of FIG. 1.

Referring to FIG. 4, the controller 24 can operate the motor 16 in a limp mode in a number of different situations. The controller 24 can measure one or more of the following parameters: the bus current (at 200); the bus voltage (at 202); the line current (at 204); and the heat sink temperature from the temperature sensor 19 (at 206). The controller 24 can determine (at 208) whether the bus current is greater than a limp current limit setting (e.g., about 7 amps). If the bus current is greater than the limp current limit setting, the controller 24 can drive (at 210) the motor 16 in a limp mode. In the limp mode, the controller 24 can reduce (at 212) one or both of an output voltage provided to the motor 16 and an operating frequency of the motor 16 (e.g., reduce the output voltage and the operational frequency along the V/Hz curve of the motor 16).

The controller 24 can also determine (at 214) whether the bus voltage is less than a programmed threshold (e.g., about 275 volts). If the bus voltage is less than the programmed threshold, the controller 24 can drive (at 210) the motor 16 in the limp mode. The controller 24 can further determine (at 216) whether the line current is greater than a programmed threshold (e.g., about 26 amps). If the line current is greater than the programmed threshold, the controller 24 can drive (at 210) the motor 16 in the limp mode.

The controller 24 can still further determine (at 218) whether the heat sink temperature read from the temperature sensor 19 is greater than a limp temperature limit setting (e.g., about 60.degree. C.). If the temperature is greater than the limp temperature limit setting, the controller 24 can drive (at 210) the motor in the limp mode. In some embodiments, the controller 24 can set the limp temperature limit setting during a power-up procedure for the motor drive (e.g., a 30 second power-up procedure). For example, the controller 24 can determine whether the input voltage from the AC bus line 22 is 115 V or 230 V. In one embodiment, if the input voltage is 115 V, the controller 24 can set the limp temperature limit setting to 51.degree. C., and if the input voltage is 230 V, the controller 24 can set the limp temperature limit setting to 60.degree. C. However, in some embodiments, a user can change the limp temperature limit setting, for example, using the external device 58 and the serial communication link 56. If the user changes the limp temperature limit setting, the controller 24 can change a control bit in the EEPROM 54 to indicate that the user has changed the limp temperature limit setting. During subsequent power-up procedures or power cycles, the controller 24 can recognize that the control bit has been changed. The controller 24 can then use the limp temperature limit setting defined by the user, rather than using one of the default limp temperature limit settings that correspond to the input voltage.

Once the controller 24 is operating the motor 16 in the limp mode, the controller 24 can attempt to continue operating (at 220) the motor drive within specified operational limits. The controller 24 can determine (at 222) whether the bus current, the bus voltage, the line current, and/or the heat sink temperature have returned to within the specified operational limits. If the motor drive cannot operate within the specified operational limits or if the controller 24 has been operating in the limp mode for too long (i.e., excessive limp), the controller 24 can shut down (at 224) the motor drive. In some embodiments, when the controller 24 operates the motor 16 in the limp mode, the controller 24 does not generate or store a fault condition code in the fault log (as described below with respect to FIG. 15). When the motor 16 is operating in the limp mode, pressure regulation may not be maintained, but system failure or shutdown can often be prevented.

As shown and described with respect to FIGS. 5-11, the controller 24 can detect a number of fault conditions and can attempt to prevent damage to itself and/or the motor 16 and/or the pump 10. In general, the following several paragraphs describe each of the fault conditions, the conditions under which the fault condition occurs, and the action the controller 24 takes after sensing the fault condition. FIG. 12 illustrates a method of creating a fault log in order to store information regarding each of the fault conditions.

Figure 5:
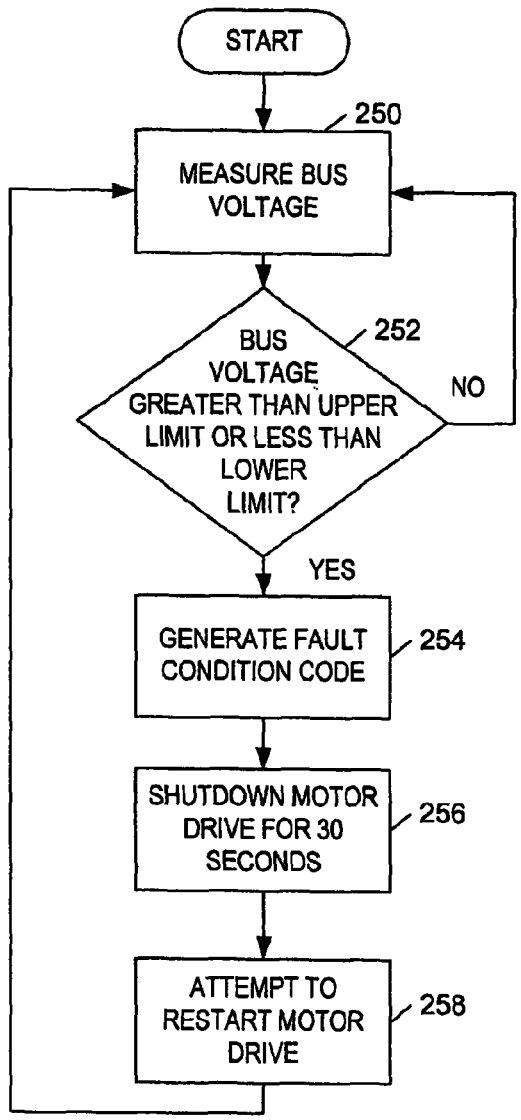
FIG. 5 is a flowchart illustrating a bus over-voltage or bus under-voltage fault method of operation for use with the pump control system of FIG. 1.

Referring to FIG. 5, the controller 24 can determine whether a bus over-voltage fault condition or a bus under-voltage fault condition has occurred by first measuring (at 250) the bus voltage of the DC bus line 48. The controller 24 can determine (at 252) whether the bus voltage is greater than an upper limit (e.g., about 450 volts) or less than a lower limit (e.g., about 250 volts). If the bus voltage is greater than the upper limit or less than the lower limit, the controller 24 can generate (at 254) a fault condition code. The controller 24 can shut down (at 256) the drive 46 to the motor 16 for a time period (e.g., about 30 seconds). The controller 24 can attempt to restart (at 258) the drive 46 after the time period has elapsed.

Figure 6:
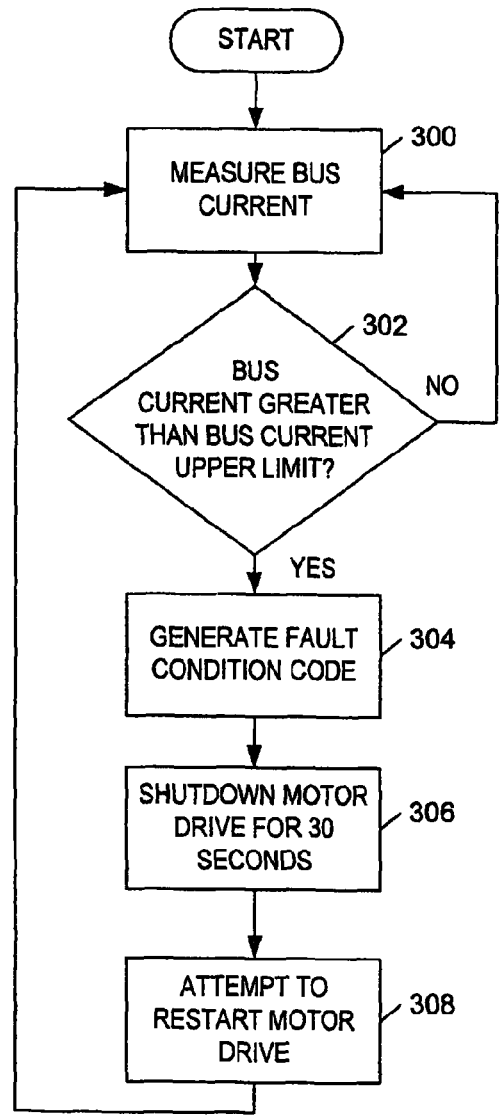
FIG. 6 is a flowchart illustrating a bus over-current fault method of operation for use with the pump control system of FIG. 1.

Referring to FIG. 6, the controller 24 can determine whether a bus over-current fault condition has occurred by first measuring (at 300) the bus current of the DC bus line 48. The controller 24 can determine (at 302) whether the bus current is greater than an upper limit (e.g., about 25 amps). If the bus current is greater than the upper limit, the controller 24 can generate (at 304) a fault condition code. The controller 24 can shut down (at 306) the drive 46 to the motor 16 for a time period (e.g., about 30 seconds). The controller 24 can attempt to restart (at 308) the drive 46 to the motor 16 after the time period has elapsed.

Figure 7:
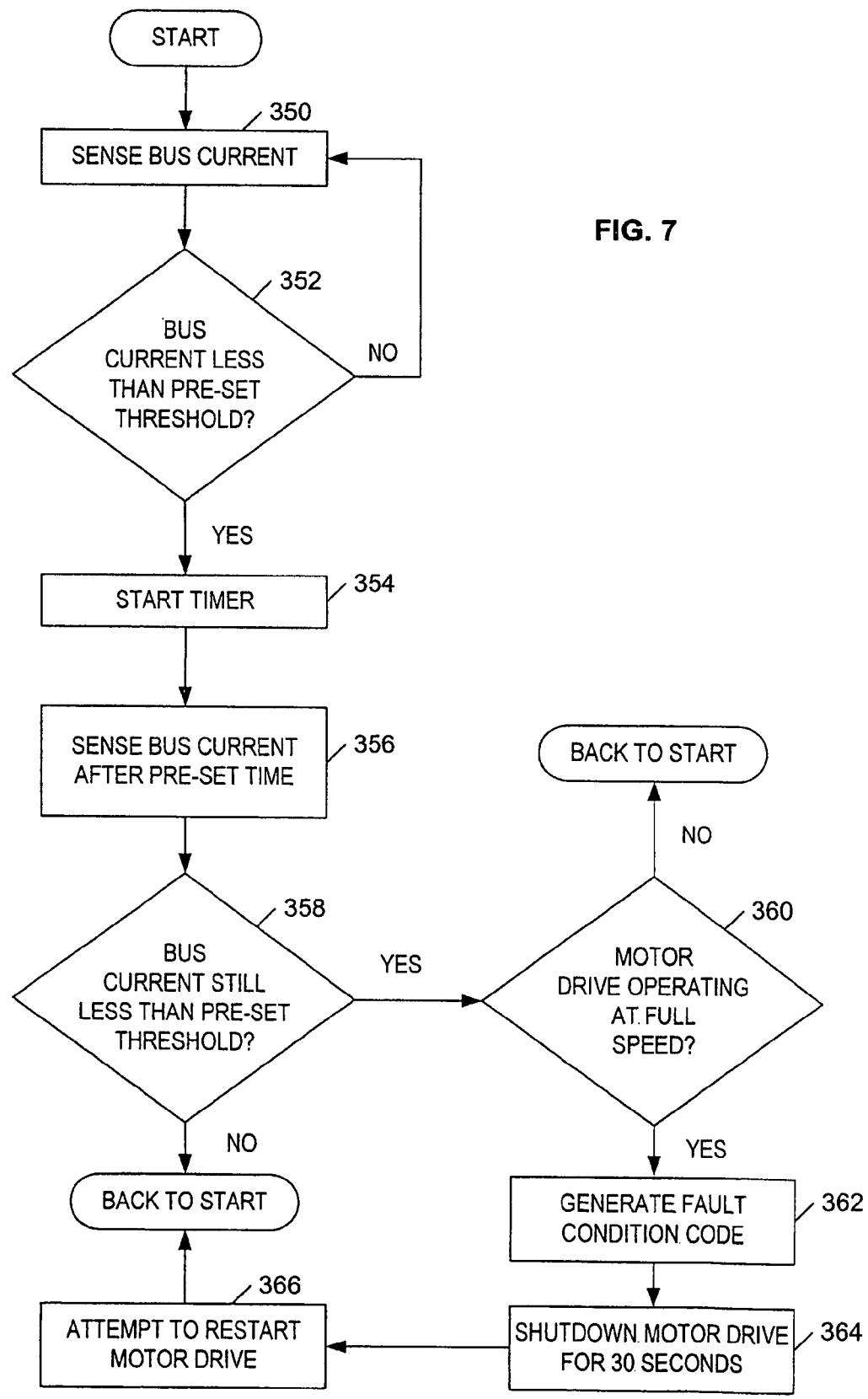
FIG. 7 is a flowchart illustrating a dry-running fault method of operation for use with the pump control system of FIG. 1.

Referring to FIG. 7, the controller 24 can determine whether a dry-running fault condition has occurred by sensing (at 350) a first bus current value from the DC bus line 48. The controller 24 can determine (at 352) whether the first bus current value is less than a pre-set threshold (e.g., about 1.5 amps). If the first bus current value is less than the pre-set threshold, the controller 24 can start (at 354) a timer. After a pre-set time period (e.g., about 1 second) has elapsed, the controller 24 can sense (at 356) a second bus current value. The controller 24 can determine (at 358) whether the second bus current value is still less than the pre-set threshold. If the second bus current is still less than the pre-set threshold, the controller 24 can determine (at 360) whether the motor drive is operating at full speed. If the motor drive is operating at full speed, the controller 24 can generate (at 362) a fault condition code. The controller 24 can shut down (at 364) the motor drive for a time period (e.g., about 30 seconds). The controller 24 can attempt to restart (at 366) the motor drive after the time period has elapsed.

Figure 8:
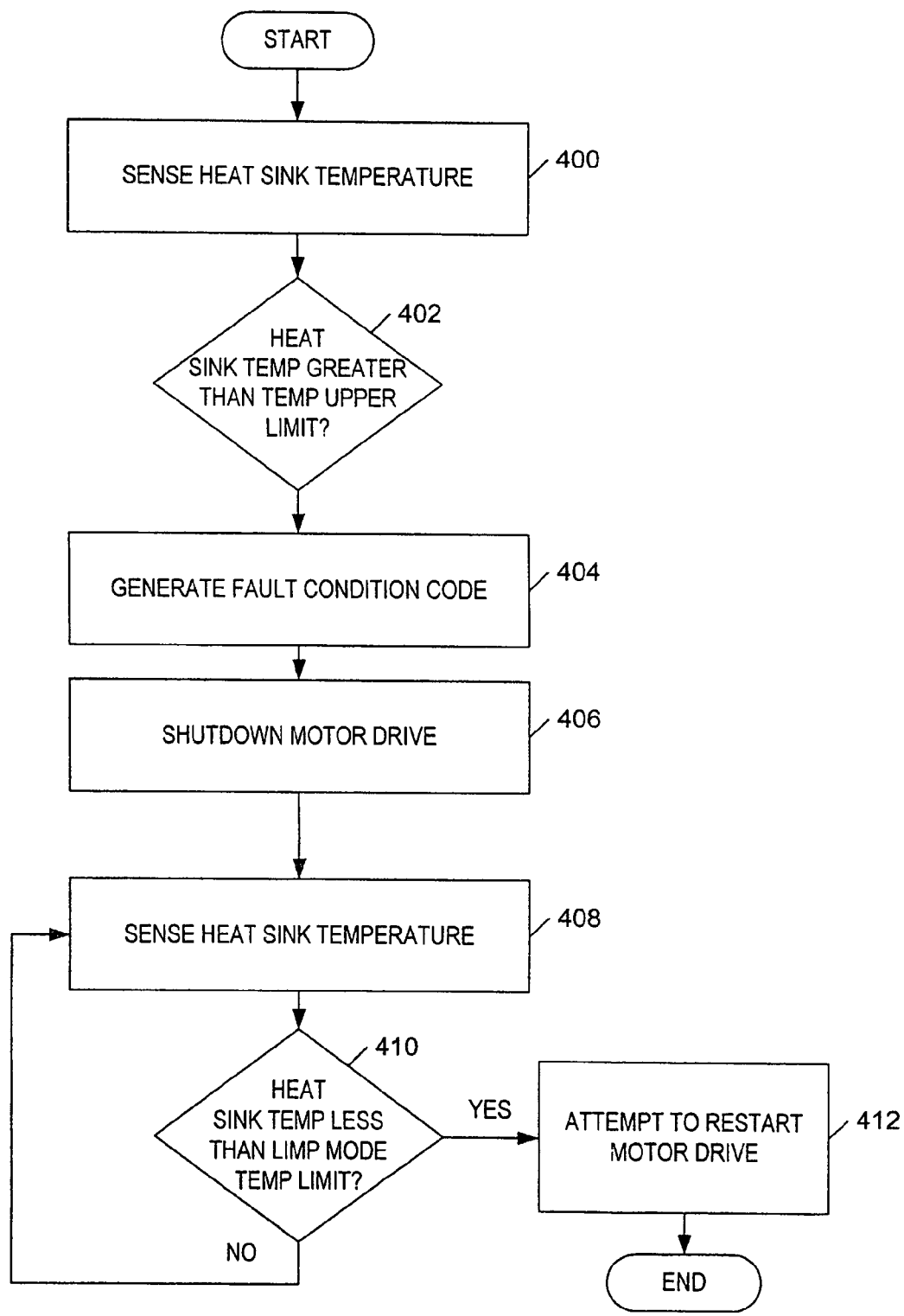
FIG. 8 is a flowchart illustrating an over-temperature fault method of operation for use with the pump control system of FIG. 1.

Referring to FIG. 8, the controller 24 can determine whether an over-temperature fault condition has occurred by sensing (at 400) a first temperature value of a heat sink (e.g., sensing a temperature of the heat sink 21 of the controller 24 with the temperature sensor 19). The controller 24 can determine (at 402) whether the first temperature value is greater than a temperature upper limit (e.g., about 70.degree. C.). If the first temperature value is greater than a temperature upper limit, the controller 24 can generate (at 404) a fault condition code. The controller 24 can also shut down (at 406) the motor drive. After the motor drive has been shut down, the controller 24 can sense (at 408) a second temperature value of the heat sink. The controller 24 can determine (at 410) whether the second temperature value is less than a limp mode temperature limit (e.g., about 60.degree. C.). If the second temperature value is less than the limp mode temperature limit, the controller 24 can attempt (at 412) to restart the motor drive. If the second temperature value is not less than the limp mode temperature limit, the controller 24 can continue to sense (at 408) the heat sink temperature until the heat sink temperature falls below the limp mode temperature limit.

Figure 9:
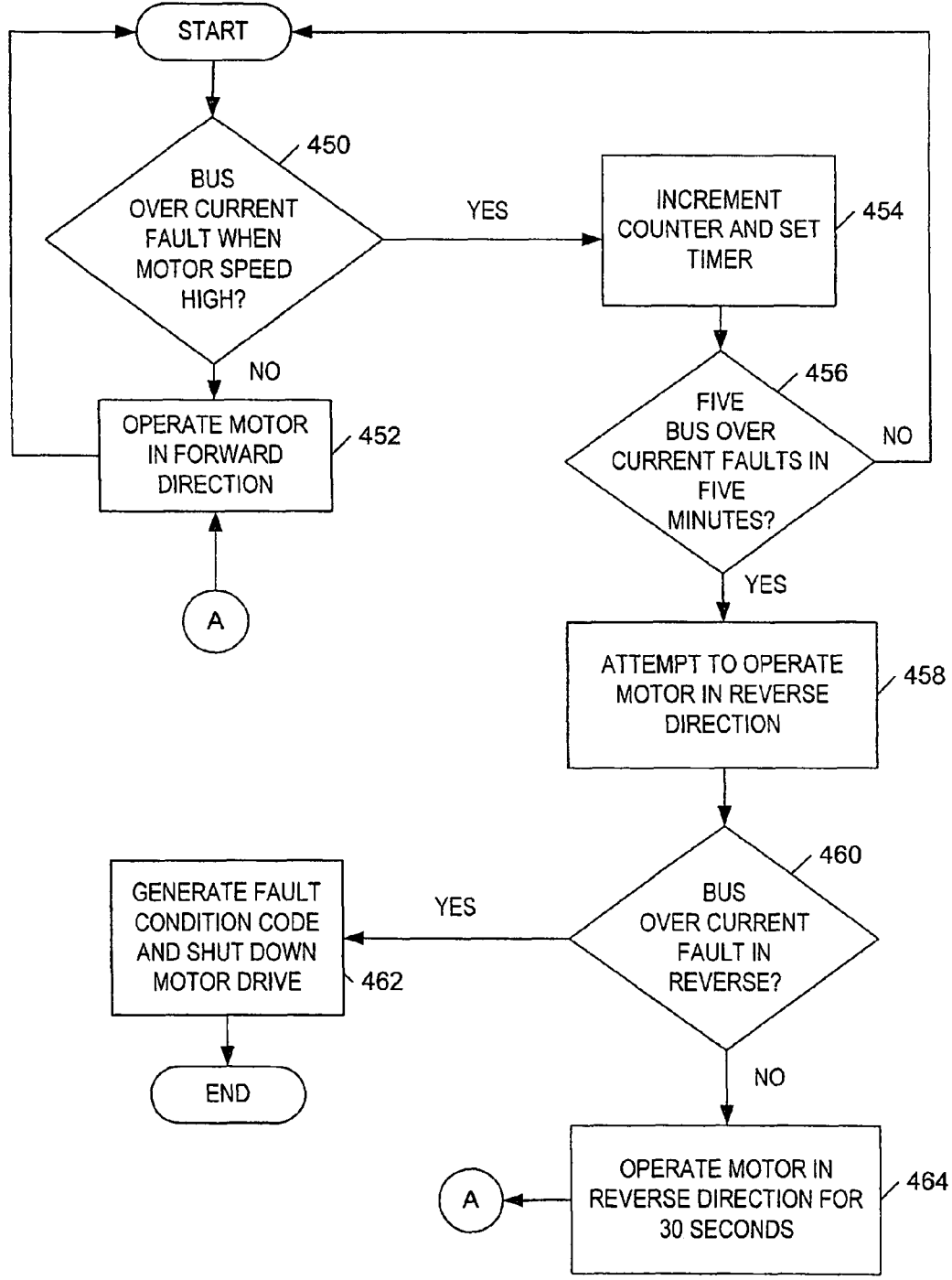
FIG. 9 is a flowchart illustrating a high-speed jamming fault method of operation for use with the pump control system of FIG. 1.

Referring to FIG. 9, the controller 24 can determine whether a high-speed jamming fault condition has occurred by sensing a first bus current value of the DC bus line 48 and by sensing the motor speed. As used herein and in the appended claims, the term "motor speed" refers to one or more of an actual speed of the motor 16, a commanded motor speed, and/or a commanded motor frequency. The controller 24 can determine (at 450) whether the first bus current value is greater than a bus current upper limit (e.g., about 15 amps) and whether the motor speed is greater than or equal to a high-speed limit. If the first bus current value is less than the bus current upper limit and/or if the motor speed is less than the high-speed limit, a high-speed jamming fault condition has not occurred and the controller 24 can continue to operate (at 452) the motor 16 in the forward direction. If the first bus current value is greater than a bus current upper limit and if the speed of the motor is greater than or equal to a high-speed limit, the controller 24 can increment (at 454) a counter and set (at 454) a timer. The controller 24 can determine (at 456) whether the counter has been incremented above an increment limit (e.g., about five times) within a first time period (e.g., about five minutes). If the counter has not been incremented above the increment limit within the first time period, the controller 24 can return to sensing (at 450) the bus current value and the motor speed. If the counter has been incremented above the increment limit within the first time period, the controller 24 can attempt to operate (at 458) the motor 16 in a reverse direction. The controller 24 can sense a second bus current value while the motor is operating in the reverse direction. The controller 24 can determine (at 460) whether the second bus current value is also greater than the bus current upper limit. If the second bus current value is also greater than the bus current upper limit (i.e., there is also a bus over-current fault condition in the reverse direction), the controller 24 can generate (at 462) a fault condition code and shut down the motor drive. If the second bus current value is less than the bus current upper limit (i.e., there is not a bus over-current fault condition in the reverse direction), the controller 24 can operate (at 464) the motor 16 in the reverse direction for a second time period (e.g., about 30 seconds). Once the second time period has elapsed and presumably the foreign object is cleared, the controller 24 can attempt (at 452) to operate the motor in the forward direction. In some embodiments, the controller 24 can also monitor for a high-speed jamming fault condition by determining the change in bus current with respect to a change in time (e.g., in order to detect rapid changes in the bus current that may indicate a high-speed jamming fault condition).

Figure 10:
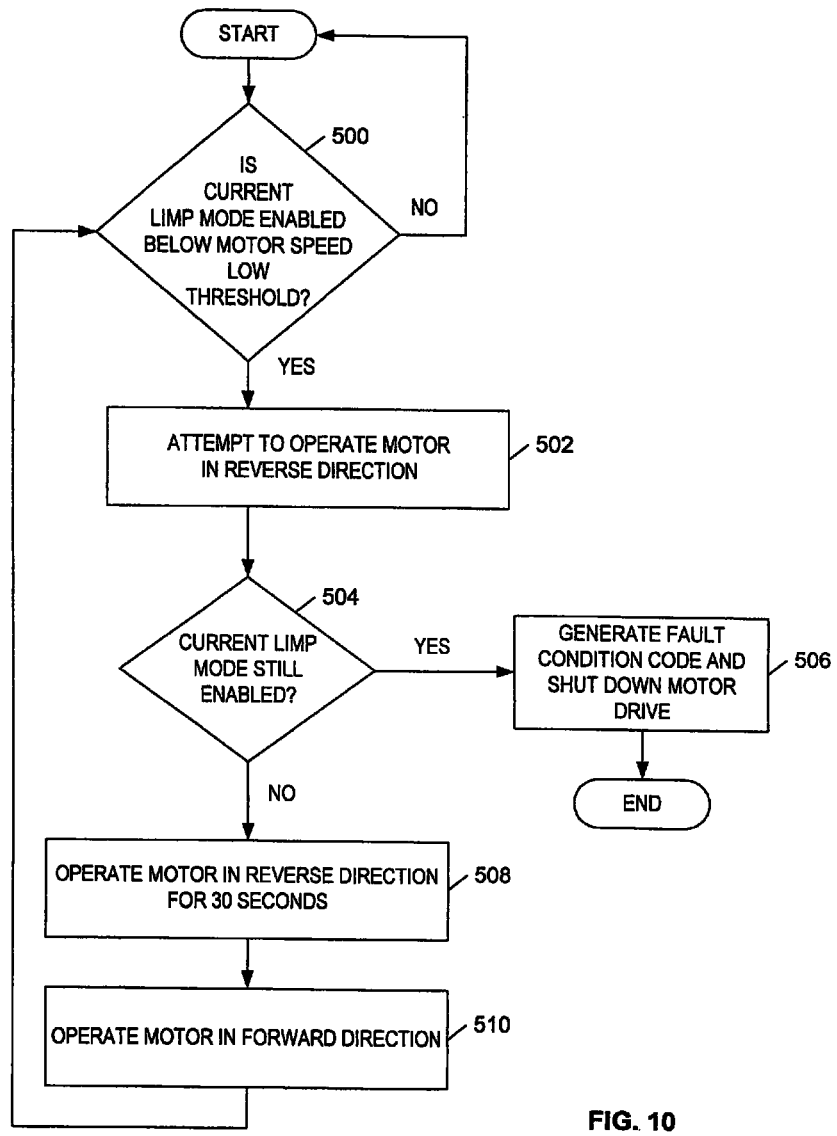
FIG. 10 is a flowchart illustrating a low-speed jamming fault method of operation for use with the pump control system of FIG. 1.

Referring to FIG. 10, the controller 24 can determine whether a low-speed jamming fault condition has occurred by sensing a first bus current value of the DC bus line 48 and sensing the motor speed. The controller 24 can determine (at 500) whether the first bus current value is greater than a programmed threshold (e.g., about 7 amps) and whether the speed of the motor is less than a motor speed low threshold. If the first bus current value is greater than a programmed threshold and if the speed of the motor is less than a motor speed low threshold, the controller 24 can attempt to operate (at 502) the motor 16 in a reverse direction. The controller 24 can sense a second bus current value while the motor is operating in the reverse direction. The controller 24 can determine (at 504) whether the second bus current value is also greater than the programmed threshold. If the second bus current value is also greater than the programmed threshold (i.e., there is also a low-speed jamming fault condition in the reverse direction), the controller 24 can generate (at 506) a fault condition code and can shut down (at 506) the motor drive. If the second bus current value is less than the programmed threshold (i.e., there is not a low-speed jamming fault condition in the reverse direction), the controller 24 can operate (at 508) the motor 16 in the reverse direction for a time period (e.g., about 30 seconds). After the time period has elapsed and presumably the foreign object is cleared, the controller 24 can attempt to operate (at 510) the motor 16 in the forward direction.

Figure 11:
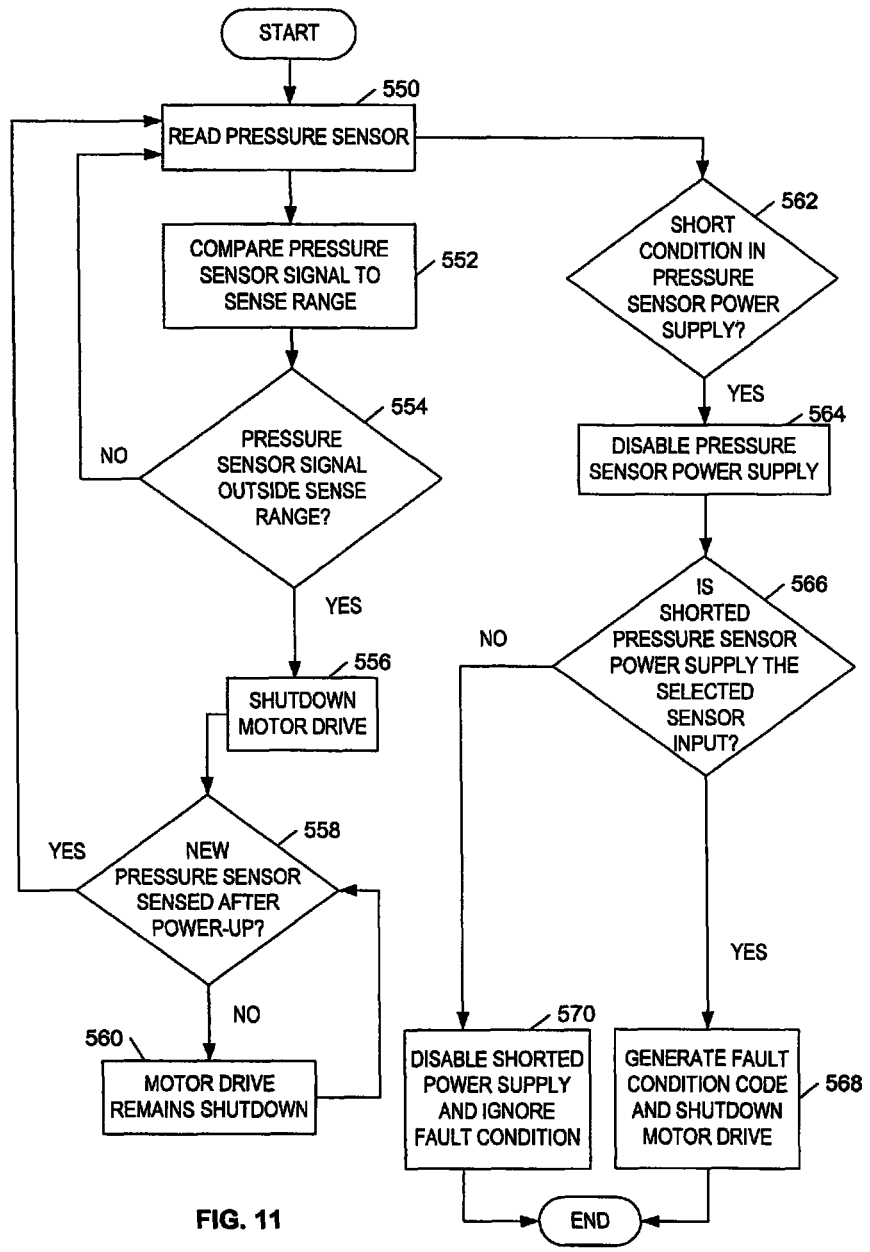
FIG. 11 is a flowchart illustrating a pressure sensor failure method of operation for use with the pump control system of FIG. 1.
Figure 12:
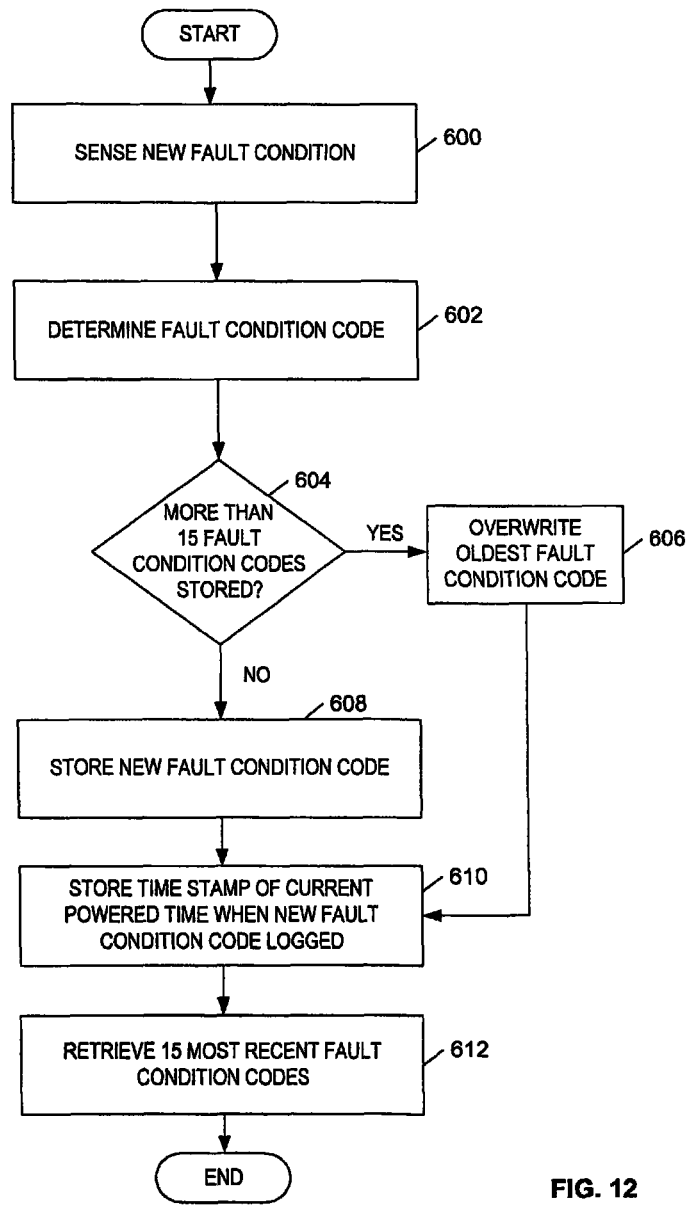
FIG. 12 is a flowchart illustrating a fault storage and fault retrieval method of operation for use with the pump control system of FIG. 1.

Referring to FIG. 11, the controller 24 can monitor the pressure sensor 18 or any other pressure sensors in the water distribution system to detect pressure sensor failure. The controller 24 can detect a first pressure sensor signal by reading (at 550) the pressure sensor 18. The controller 24 can compare (at 552) the first pressure sensor signal to a sense range. The controller 24 can determine (at 554) whether the first pressure sensor signal is outside of the sense range (e.g., the pressure sensor itself may be shorted, not connected, or open, or a cable connected to the pressure sensor may be shorted, not connected, or open). If the pressure sensor signal is outside of the sense range, the controller 24 can shut down (at 556) the motor drive. The controller 24 can determine (at 558) whether the pressure sensor has been replaced or repaired by attempting to detect a second pressure sensor signal after power has be reapplied to the motor drive. If the controller 24 does not sense a second pressure sensor signal, the controller 24 can allow (at 560) the motor drive to remain shut down until a second pressure signal is detected.

Also referring to FIG. 11, the controller 24 can determine whether the pressure sensor 18 is failing due to a short condition with respect to the power supply for the pressure sensor 18. The controller 24 can detect a pressure sensor signal by reading (at 550) the pressure sensor 18. The controller 24 can determine (at 562) whether the pressure sensor signal indicates that the power supply is shorted. If the pressure sensor signal does indicate that the power supply is shorted, the controller 24 can disable (at 564) the power supply. The controller 24 can determine (at 566) whether the shorted power supply is the selected sensor input for the pressure sensor 18. If the shorted power supply is the selected sensor input for the pressure sensor 18, the controller 24 can generate (at 568) a fault condition code and can shut down (at 568) the motor drive. If the shorted power supply is not the selected sensor input for the pressure sensor 18, the controller 24 can disable (at 570) the shorted power supply and/or ignore (at 570) the fault condition.

The controller 24 can determine whether a power device/ground fault has occurred by determining whether a power-device protection interrupt (PDPINTA) input has been generated. The PDPINTA input can be generated by hardware (i.e., ground current, damaged IGBT, shorted output, etc.) and sent to an interrupt pin on the DSP 26. At the detection of this fault condition, the controller 24 can shut down the motor drive. The controller 24 can restart the motor drive after a time period (e.g., about 30 seconds). If three PDPINTA inputs occur since the last power-up, the controller 24 can turn the motor drive off. In one embodiment, the controller 24 does not turn the motor drive on again until a power cycle causes the fault condition to clear.

Referring to FIG. 12, the controller 24 can create a fault log that a user can access in order to monitor the operation of the controller 24, the pump 10, and/or the motor 16. The controller 24 can sense (at 600) that a new fault condition has occurred (as described above with respect to any one of FIGS. 5-11). The controller 24 can determine (at 602) the fault condition code corresponding to the new fault condition and can increment a counter. The controller 24 can determine (at 604) whether the counter has been incremented above an increment limit (e.g., 15 fault condition codes). If the counter has been incremented above the increment limit, the controller 24 can store the new fault condition code by overwriting (at 606) one of the old fault condition codes. If the counter has not been incremented above the increment limit, the controller 24 can store (at 608) the new fault condition code in a new memory location. The controller 24 can also store (at 610) a time stamp of the current powered time when the new fault condition code is logged. Using the serial communication link 56 and the external device 58, a user can retrieve (at 612) the new fault condition code and the old fault condition codes (which, in some embodiments, is the 15 most-recent fault condition codes). In other embodiments, a user can retrieve the fault condition codes using other technologies, such as various forms of wireless communication (e.g., cellular or infrared wireless communication).

The controller 24 can operate one of the LEDs (e.g., LED B shown in FIG. 1, which can be a red LED) in order to indicate to a user that one or more fault conditions have occurred. If no faults have occurred since the last reset (either by a power cycle or by a user pressing the clear fault LED button 68 or by the system), the controller 24 can keep LED B in a de-energized state. The controller 24 can provide an indication of the most recent faults by flashing LED B at various rates. The flash rate can depend on the category or group of the most recent faults. For example, LED B can flash slowly for dry-running, bus over-voltage, and bus under-voltage fault conditions. Also, LED B can flash quickly for bus over-current, power device/ground fault, and jam detection fault conditions. In addition, LED B can flash at a combination rate for pressure sensor failure and over-temperature fault conditions. The controller 24 can keep LED B lit continuously if too many faults conditions occur within a set time period (e.g., 15 fault conditions within about 30 minutes). However, in one embodiment, LED B is lit when a fault condition is occurring, but the controller 24 shuts off LED B if the fault condition is no longer occurring. In other words, LED B does not remain lit continuously once the fault condition is no longer occurring, even if the pump control system 14 does not include a clear fault LED button 68 or a user has not pushed the clear fault LED button 68. If the power is cycled or a user presses the clear fault LED button 68, the controller 24 can reset the fault counter and the fault timer. In some embodiments, when any fault condition occurs, if the fault timer is greater than about 30 minutes, the controller 24 can reset the fault timer to zero. In some embodiments, after a fault condition stops the motor 16 (with the exception of over-temperature, power device/ground fault, and pressure sensor fault conditions), the controller 24 can wait about 30 seconds and then attempt to restart the motor 16.

It should be understood that although the above description refers to the steps shown in FIGS. 2-12 in a particular order, that the scope of the appended claims is not to be limited to any particular order. The steps described above can be performed in various different orders and still fall within the scope of the invention. In addition, the various pressure, voltage, and current thresholds, values, and time periods or durations discussed above are included by way of example only and are not intended to limit the scope of the claims.

In general, all the embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention as set forth in the appended claims.

I claim:

1. A method of calibrating a pump having a motor, the pump connected to a water distribution system, the method comprising;
    a) providing a constant pressure setpoint;
    b) operating the motor in a forward direction;
    c) sensing a pressure in the water distribution system;
    d) determining whether the sensed pressure has increased by a first pressure increment;
    e) increasing an operating frequency of the motor by a first frequency increment if the sensed pressure has not increased by the first pressure increment;
    f) storing a speed of the motor as a minimum calibrated speed value when the sensed pressure has increased by the first pressure increment; and
    g) setting the minimum calibrated speed value as an initial starting speed of the motor whenever the motor is initially turned on or restarted;
        wherein a controller performs at least steps b), c), d), and f) when the pump is installed or a new constant pressure setpoint is provided.

2. The method of claim 1 and further comprising reducing the speed of the motor by a second frequency increment before storing the speed of the motor as the minimum calibrated speed value.

3. The method of claim 1 and further comprising sensing the pressure between the pump and a water tank.

4. The method of claim 1 wherein the first pressure increment is about one pound per square inch and the first frequency increment is about one Hertz.

5. The method of claim 1 and further comprising setting at least one gain based on the minimum calibrated speed value.

6. The method of claim 1 and further comprising sensing the pressure in the water distribution system when the water distribution system is connected to at least one of a well pump system, a municipal water system, a pool system, a spa system, a recreational vehicle water system, a marine craft water system, a turf or irrigation system, and a pressure boost system.

7. The method of claim 1 and further comprising setting a gain for a proportional/integral control loop based on the minimum calibrated speed value.

8. The method of claim 1 and further comprising performing a regulation mode to increase the pressure in a water tank to a tank pressure setpoint.

9. The method of claim 1 wherein the motor is started operating at a minimum operating speed.

* * * * *